US011954398B2

(12) United States Patent
Moon et al.

(10) Patent No.: US 11,954,398 B2
(45) Date of Patent: Apr. 9, 2024

(54) ELECTRONIC DEVICE AND METHOD FOR PROVIDING NOTIFICATION THEREOF

(71) Applicant: SAMSUNG ELECTRONICS CO., LTD., Suwon-si (KR)

(72) Inventors: Taeyong Moon, Suwon-si (KR); Sangheon Kim, Suwon-si (KR); Wooyoung Park, Suwon-si (KR); Youngseung Seo, Suwon-si (KR); Gisoo Lee, Suwon-si (KR); Jiwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 17/523,514

(22) Filed: Nov. 10, 2021

(65) Prior Publication Data
US 2022/0066724 A1 Mar. 3, 2022

Related U.S. Application Data

(63) Continuation of application No. PCT/KR2020/001743, filed on Feb. 7, 2020.

(30) Foreign Application Priority Data

May 15, 2019 (KR) .................. 10-2019-0056752

(51) Int. Cl.
*G06F 3/147* (2006.01)
*G06F 1/16* (2006.01)

(52) U.S. Cl.
CPC ............ *G06F 3/147* (2013.01); *G06F 1/1616* (2013.01); *G06F 1/1652* (2013.01); *G06F 1/1681* (2013.01)

(58) Field of Classification Search
CPC ...... G06F 3/147; G06F 1/1616; G06F 1/1652; G06F 1/1681; G06F 2203/04803; G09G 2354/00; G09G 2380/02
See application file for complete search history.

(56) References Cited

U.S. PATENT DOCUMENTS 8,854,332 B1 * 10/2014 Cho ...................... G06F 1/1643
345/173
9,349,342 B2 * 5/2016 Zhang .................. G06F 1/1641
(Continued)

FOREIGN PATENT DOCUMENTS

KR 10-2015-0026537 3/2015
KR 10-2015-0094358 8/2015
(Continued)

OTHER PUBLICATIONS

Machine Translation of cited IDS reference KR-20150094358-A, Published Aug. 19, 2015, All Pages. (Year: 2015).*
(Continued)

*Primary Examiner* — Michael J Jansen, II
(74) *Attorney, Agent, or Firm* — NIXON & VANDERHYE P.C.

(57) ABSTRACT

An electronic device according to various embodiments of the disclosure comprises: a foldable housing, a flexible display, a communication circuit, a sensor module, a processor, and a memory. The memory can store instructions that, when executed, cause the processor to sense whether an event configured to display a user interface has occurred, identify an angle between a first housing and a second housing using the sensor module, determine, based on the identified angle, at least one area for displaying the user interface from among at least one edge area or folding area of the flexible display, and control the display to display the user interface in the determined at least one area.

15 Claims, 22 Drawing Sheets

(56) References Cited

U.S. PATENT DOCUMENTS

| | | | | |
|---|---|---|---|---|
| 9,448,660 B2* | 9/2016 | Seo | ................ | G06F 1/1652 |
| 9,524,139 B2* | 12/2016 | Aurongzeb | ........... | G06F 3/0227 |
| 9,531,422 B2* | 12/2016 | Jang | ................ | H04M 1/04 |
| 9,537,527 B2* | 1/2017 | Huh | ................ | H04R 5/02 |
| 9,619,061 B2* | 4/2017 | Lee | ................ | G06F 1/1626 |
| 9,639,177 B2* | 5/2017 | Kim | ................ | G06F 3/1431 |
| 9,684,342 B2* | 6/2017 | Kim | ................ | G06F 3/04883 |
| 9,823,890 B1* | 11/2017 | Lewbel | ................ | G06F 3/1446 |
| 9,830,075 B2* | 11/2017 | Kim | ................ | G06F 1/1641 |
| 9,857,957 B2* | 1/2018 | Lee | ................ | G06F 1/1613 |
| 9,864,410 B2* | 1/2018 | La | ................ | G06F 1/1652 |
| 10,133,310 B2* | 11/2018 | Kim | ................ | G06F 3/147 |
| 10,200,521 B2* | 2/2019 | Kim | ................ | H04M 1/0214 |
| 10,403,241 B2* | 9/2019 | Kim | ................ | G09G 3/20 |
| 10,437,421 B2* | 10/2019 | Kang | ................ | H04M 1/0245 |
| 10,504,488 B2* | 12/2019 | Chun | ................ | G06F 1/1616 |
| 10,736,042 B2* | 8/2020 | Lee | ................ | H04M 1/0269 |
| 10,866,694 B2* | 12/2020 | Kim | ................ | G06F 3/1446 |
| 11,042,192 B2* | 6/2021 | Choi | ................ | G06F 9/4843 |
| 11,138,912 B2* | 10/2021 | Klein | ................ | G06F 1/1677 |
| 11,138,949 B2* | 10/2021 | Iyer | ................ | G06F 1/1677 |
| 11,595,510 B2* | 2/2023 | Noh | ................ | G06F 1/1637 |
| 2010/0182265 A1* | 7/2010 | Kim | ................ | G06F 1/1641 |
| | | | | 345/1.3 |
| 2013/0077260 A1* | 3/2013 | Sirpal | ................ | H05K 5/0226 |
| | | | | 361/728 |
| 2013/0229324 A1* | 9/2013 | Zhang | ................ | G06F 3/1446 |
| | | | | 345/1.3 |
| 2014/0028596 A1* | 1/2014 | Seo | ................ | H04M 1/0268 |
| | | | | 345/173 |
| 2014/0285449 A1* | 9/2014 | Cho | ................ | G06F 3/04886 |
| | | | | 345/173 |
| 2015/0062025 A1* | 3/2015 | Lee | ................ | G06F 1/1626 |
| | | | | 345/173 |
| 2015/0116362 A1* | 4/2015 | Aurongzeb | ........... | G06F 3/1446 |
| | | | | 345/650 |
| 2015/0155903 A1* | 6/2015 | Jang | ................ | H04M 1/72403 |
| | | | | 455/575.8 |
| 2015/0227271 A1* | 8/2015 | Kang | ................ | G06F 3/0487 |
| | | | | 715/781 |
| 2015/0338888 A1* | 11/2015 | Kim | ................ | G06F 1/1643 |
| | | | | 345/156 |
| 2016/0026381 A1* | 1/2016 | Kim | ................ | G06F 3/04817 |
| | | | | 715/761 |
| 2016/0085319 A1* | 3/2016 | Kim | ................ | H04M 1/0268 |
| | | | | 345/156 |
| 2016/0132074 A1* | 5/2016 | Kim | ................ | G06F 1/1652 |
| | | | | 345/173 |
| 2016/0184700 A1* | 6/2016 | Lee | ................ | G06F 3/1423 |
| | | | | 463/31 |
| 2016/0187994 A1* | 6/2016 | La | ................ | G06F 3/147 |
| | | | | 345/619 |
| 2016/0191097 A1* | 6/2016 | Huh | ................ | H04R 1/025 |
| | | | | 455/575.1 |
| 2017/0206863 A1* | 7/2017 | An | ................ | G06F 3/0338 |
| 2017/0221456 A1* | 8/2017 | Kim | ................ | G06F 1/1641 |
| 2017/0229100 A1* | 8/2017 | Chun | ................ | G09G 5/38 |
| 2018/0242242 A1* | 8/2018 | Lee | ................ | H04M 19/048 |
| 2018/0359350 A1* | 12/2018 | Kim | ................ | H04M 1/72403 |
| 2019/0042066 A1* | 2/2019 | Kim | ................ | H04M 1/725 |
| 2019/0278336 A1* | 9/2019 | Choi | ................ | G06F 1/1677 |
| 2020/0365110 A1* | 11/2020 | Iyer | ................ | G06F 3/147 |
| 2021/0097901 A1* | 4/2021 | Klein | ................ | G06F 3/0481 |
| 2021/0357034 A1* | 11/2021 | Trinh | ................ | G06F 3/04883 |
| 2021/0392224 A1* | 12/2021 | Noh | ................ | G06F 3/048 |
| 2022/0066724 A1* | 3/2022 | Moon | ................ | G06F 3/0481 |
| 2022/0222027 A1* | 7/2022 | Zhang | ................ | H04M 1/0241 |
| 2022/0303379 A1* | 9/2022 | Lee | ................ | G06F 3/14 |

FOREIGN PATENT DOCUMENTS

| | | |
|---|---|---|
| KR | 10-2016-0032079 | 3/2016 |
| KR | 10-2016-0080034 | 7/2016 |
| KR | 10-2017-0086801 | 7/2017 |
| KR | 10-2018-0134668 | 12/2018 |
| WO | 2016/060291 | 4/2016 |

OTHER PUBLICATIONS

International Search Report for PCT/KR2020/001743 dated May 21, 2020, 7 pages.
Written Opinion for PCT/KR2020/001743 dated May 21, 2020, 5 pages.

* cited by examiner

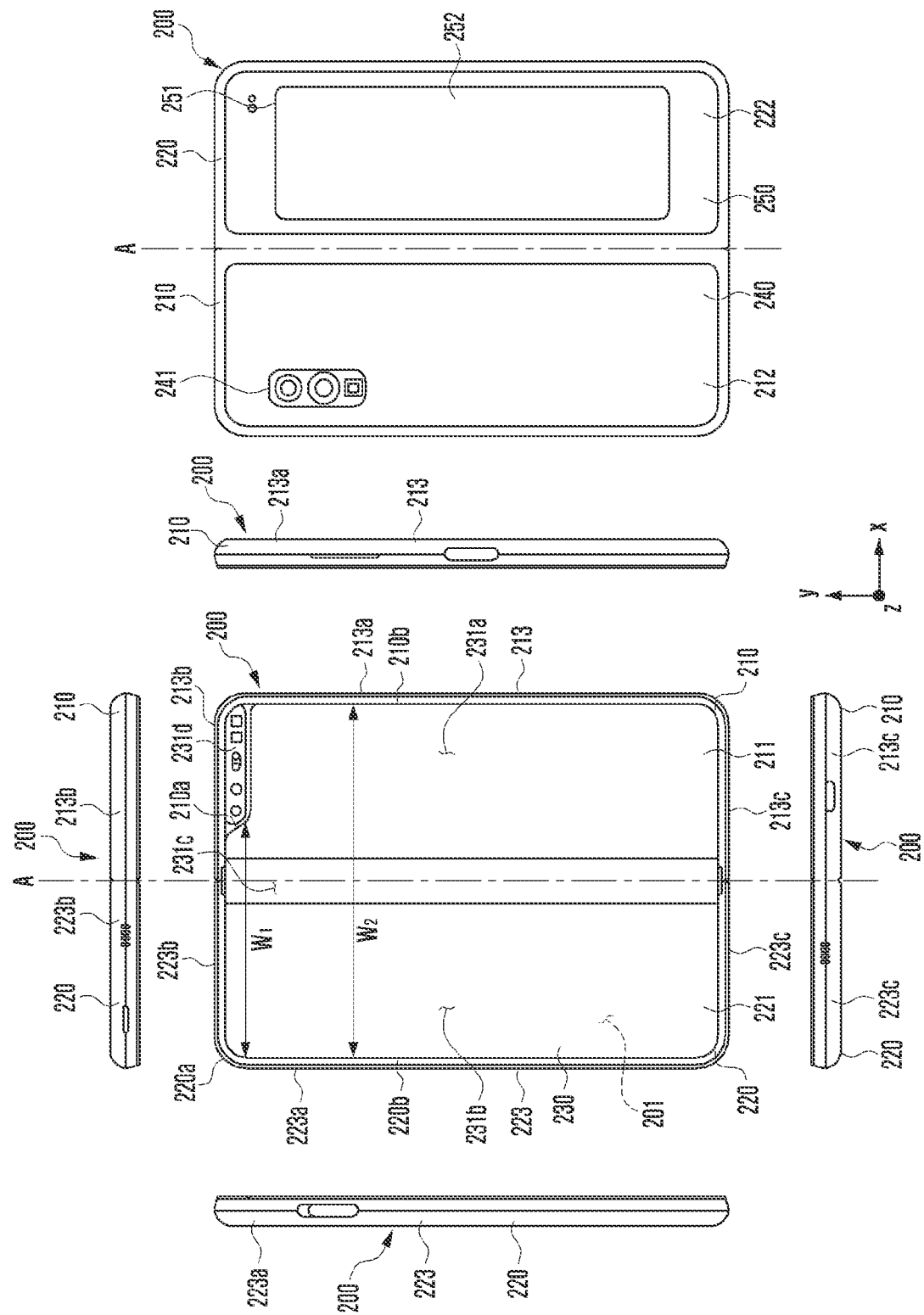

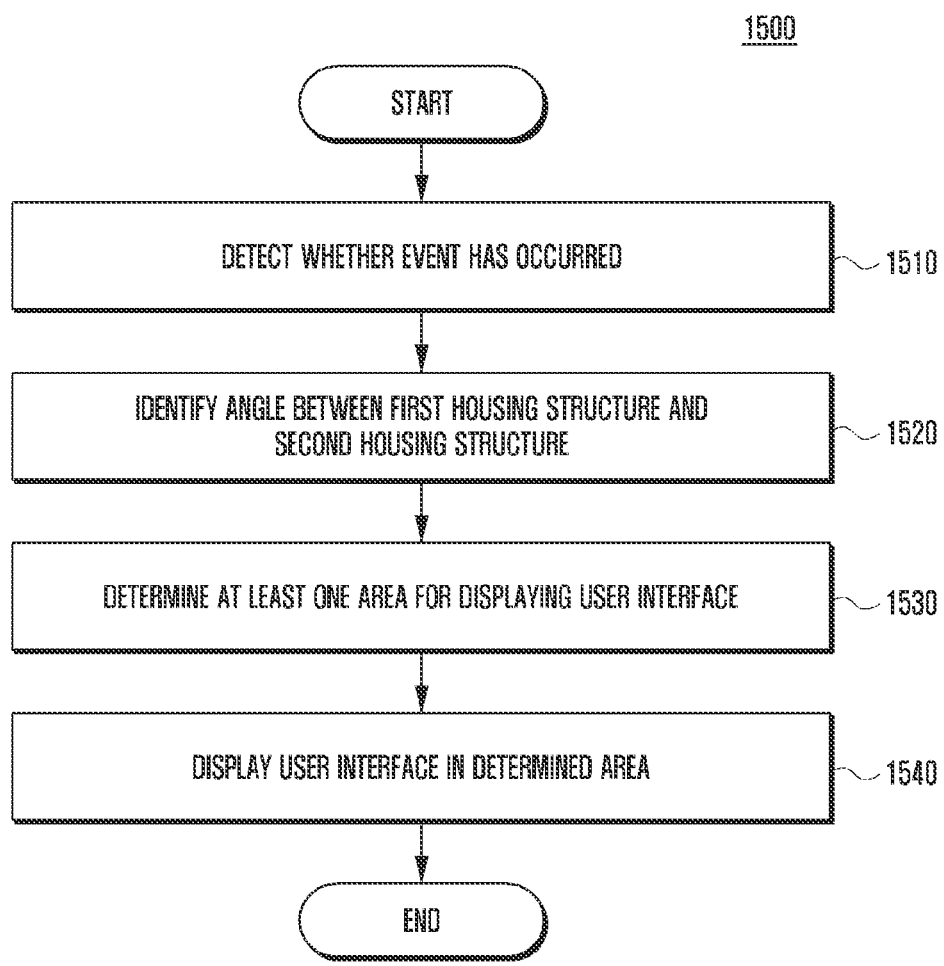

ELECTRONIC DEVICE AND METHOD FOR PROVIDING NOTIFICATION THEREOF

CROSS-REFERENCE TO RELATED APPLICATIONS

This application is a continuation of International Application No. PCT/KR2020/001743 designating the United States, filed on Feb. 7, 2020, in the Korean Intellectual Property Receiving Office and claiming priority to Korean Patent Application No. 10-2019-0056752, filed on May 15, 2019, in the Korean Intellectual Property Office, the disclosures of which are incorporated by reference herein in their entireties.

BACKGROUND

Field

The disclosure relates to a method for providing notifications by an electronic device, and a device therefor.

Description of Related Art

Recently, electronic devices visually provide users with notifications (for example, popups) corresponding to event occurrences using displays. Visual notifications may be provided to users through displays of electronic devices. In addition, notifications with minimized current consumption may be provided using an AMOLED Low Power Mode (ALPM) or Hybrid Low Power Mode (HLPM) technology (low-power display mode).

There has recently been extensive research/development regarding foldable electronic devices having a housing that can be folded or unfolded around a hinge structure. Foldable electronic devices are expected to be next-generation electronic devices capable of improving user convenience because the display area can be expanded in the unfolded state, while the volume can be reduced in the folded state.

A foldable electronic device may operate in a mobile mode (for example, a mode of operation in which the housing remains folded), a tablet mode (for example, a mode of operation in which the housing remains unfolded by 180°), or a stand mode (for example, a mode of operation in which the angle of the housing is larger than 0° and smaller than 180°), and the size (or area) of the used display may vary depending on whether the electronic device is folded or unfolded. If a notification is delivered to the user regardless of the degree of unfolding of the foldable electronic device, the user may fail to recognize the notification depending on the folded or unfolded state, and power consumption may be wasted.

When a foldable electronic device undergoes a folding or unfolding operation, the user may not recognize a change in the geometrical shape of the electronic device. If the user fails to visually recognize such a change in the geometrical shape of the foldable electronic device, the user may fail to recognize a problem caused by such a change in the geometrical shape of the foldable electronic device.

SUMMARY

An electronic device according to various example embodiments may include: a foldable housing including a hinge; a first housing connected to the hinge and including a first surface facing a first direction and a second surface facing a second direction opposite the first direction; and a second housing connected to the hinge, including a third surface facing a third direction and a fourth surface facing a fourth direction opposite the third direction, the second housing configured to fold onto the first housing about the hinge, the third direction being opposite the first direction in a folded state, and the third direction being identical to the first direction in a fully unfolded state; a flexible display configured to be visible through the first surface of the first housing and the third surface of the second housing and including at least one edge area and/or folding area; a communication circuit disposed in the foldable housing; a sensor module including at least one sensor disposed in the foldable housing; a processor disposed in the first housing or the second housing and operatively connected to the flexible display, the communication circuit, and the sensor module; and a memory operatively connected to the processor. According to various example embodiments, the memory may store instructions that, when executed, cause the processor to: sense whether an event causing the display to display a user interface has occurred, identify an angle between the first housing and the second housing using the sensor module, determine, based on the identified angle, at least one area of the flexible display for displaying the user interface from among the at least one edge area or folding area, and control the display to display the user interface in the determined at least one area.

A method for providing a notification by an electronic device according to various example embodiments may include: sensing whether an event causing the display to display a user interface has occurred; identifying, using a sensor module, an angle between a first housing connected to a hinge and including a first surface facing a first direction and a second surface facing a second direction opposite the first direction, and a second housing connected to the hinge and including a third surface facing a third direction and a fourth surface facing a fourth direction opposite the third direction, the second housing configured to fold onto the first housing about the hinge; determining, based on the identified angle, at least one area for displaying the user interface from among at least one edge area or folding area of the flexible display; and displaying the user interface in the determined at least one area through the flexible display.

An electronic device according to various example embodiments of the disclosure may determine an area on a display, in which a user interface is to be display, based on the angle between a first housing structure and a second housing structure, thereby providing a notification (for example, lighting) appropriate for the user according to whether the foldable electronic device is folded or unfolded.

An electronic device according to various example embodiments of the disclosure may visually display a user interface such that the user can recognize a change in the geometrical shape of the electronic device, thereby improving the usability of the foldable electronic device by the user.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2A is a diagram illustrating an unfolded state of an electronic device according to various embodiments;

FIG. 15 is a flowchart illustrating an example method of operating an electronic device according to various embodiments.

In connection with the description of the drawings, like or similar reference numerals may be used for like or similar elements.

DETAILED DESCRIPTION

Figure 1:
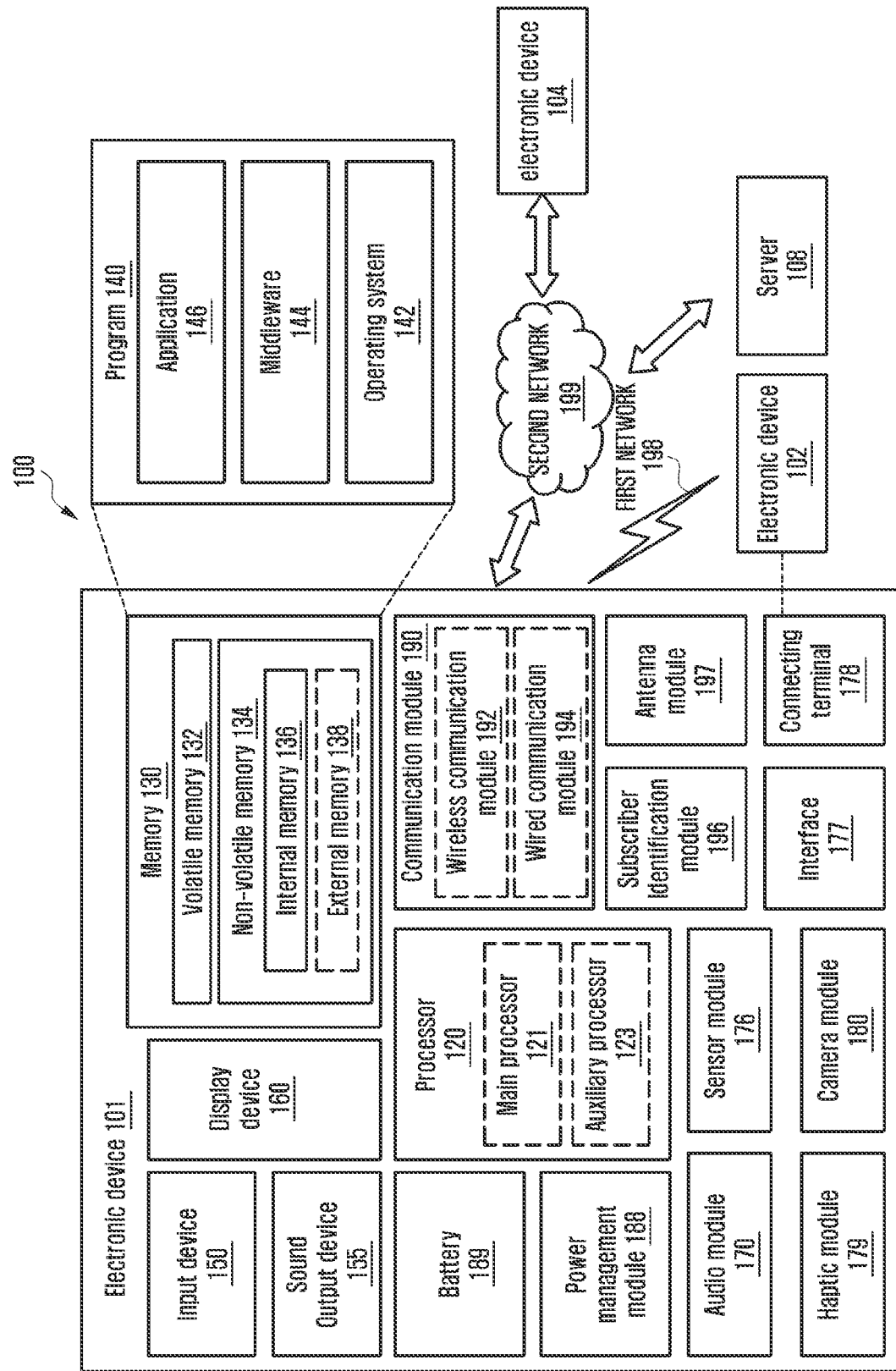
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2B:
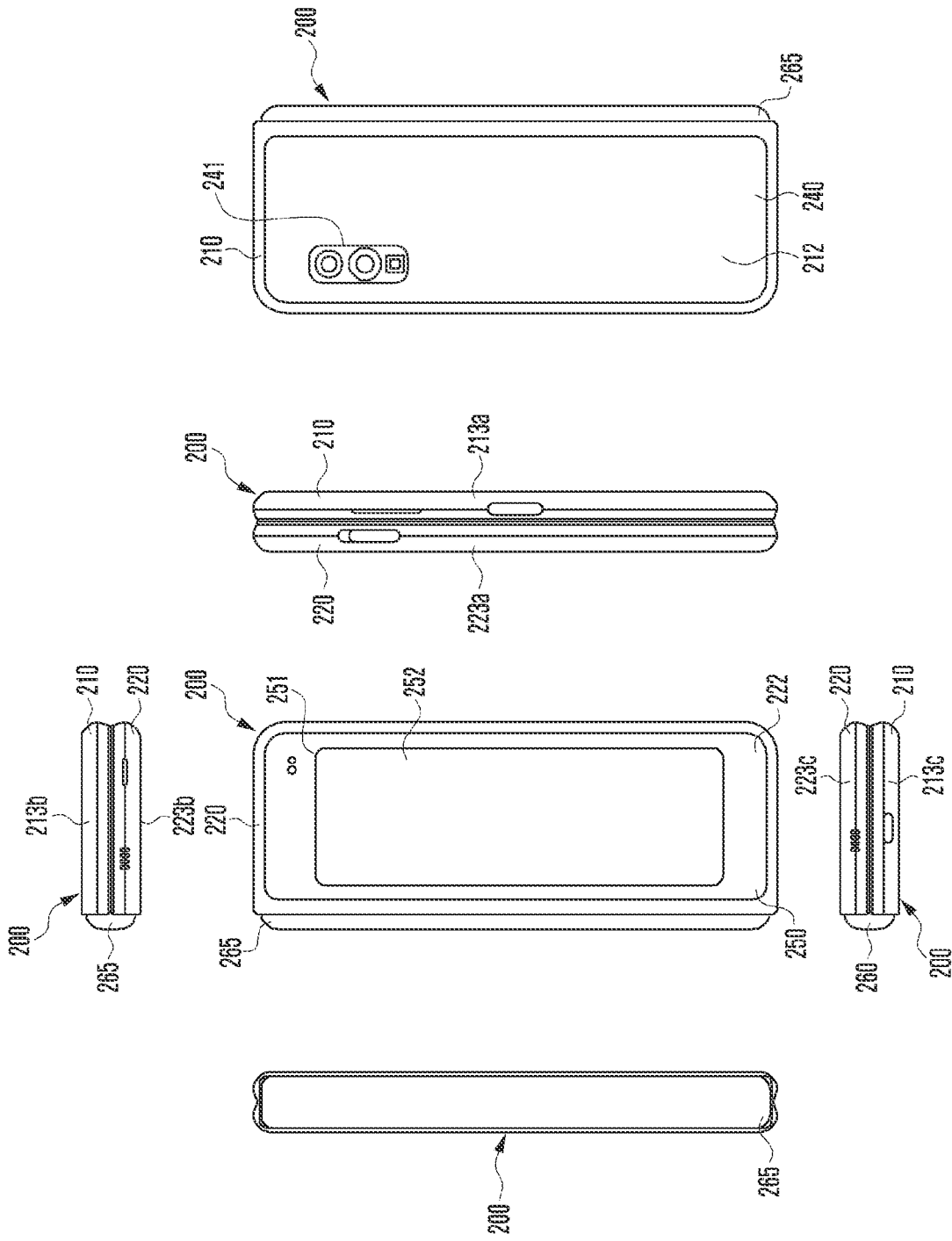
FIG. 2B is a diagram illustrating a folded state of an electronic device according to various embodiments.

FIG. 2A is a diagram illustrating an unfolded state of an electronic device 200 according to various embodiments. FIG. 2B is a diagram illustrating a folded state of the electronic device 200 in FIG. 2A according to various embodiments.

The electronic device 200 of FIG. 2A and FIG. 2B may be similar to an electronic device 101 in FIG. 1 in at least a part thereof or may include other embodiments of an electronic device.

Referring to FIG. 2A, the electronic device 200 may include a pair of housing structures 210 and 220 rotatably coupled to each other via a hinge structure (e.g., hinge structure 264 in FIG. 3) so as to be folded toward each other, a hinge cover 265 for covering a foldable portion of the pair of housing structures 210 and 220, and a display 230 (e.g., flexible display or foldable display) disposed in a space formed by the pair of the housing structures 210 and 220. In the disclosure, the surface having a display 230 disposed thereon may be defined as a front surface of the electronic device 200 and the opposite surface of the front surface may be defined as a rear surface of the electronic device 200. The surface surrounds a space between the front surface and the rear surface may be defined as a lateral surface of the electronic device 200.

In an embodiment, the pair of housing structures 210 and 220 may include a first housing structure 210 having a sensor area 231*d*, a second housing structure 220, a first rear surface cover 240, and a second rear surface cover 250. The pair of housing structures 210 and 220 of the electronic device 200 is not limited to the shape and coupling shown in FIG. 2A and FIG. 2B, and may be implemented by a combination and/or coupling of other shapes or components. For example, in an embodiment, the first housing structure 210 and the first rear surface cover 240 may be integrally formed and the second housing structure 220 and the second rear surface cover 250 may be integrally formed.

According to an embodiment, the first housing structure 210 and the second housing structure 220 are arranged at opposite sides around a folding axis (axis A) and have generally symmetric shapes with respect to the folding axis (axis A). According to an embodiment, the angle or distance between the first housing structure 210 and the second housing structure 220 may be changed depending on whether the electronic device 200 is in an unfolded state (flat stage or closing state), a folded state (folding state), or an intermediate state. According to an embodiment, the first housing structure 210, unlike the second housing structure 220, may additionally include a sensor area 231*d* in which various sensors are disposed, but may have a symmetrical shape to the second housing structure 220 in other areas. In an embodiment, the sensor disposition area 231*d* may be additionally disposed in at least some areas in the second housing structure 220 or replaced.

In an embodiment, when the electronic device 200 is in the unfolded state, the first housing structure 210 is connected to the hinge structure (e.g., hinge structure 264 in FIG. 3) and may include a first surface 211 disposed to face the front surface of the electronic device 200, a second surface 212 facing a direction opposite to the first surface 211, and a first lateral member 213 surrounding at least a part of a space between the first surface 211 and the second surface 212. In an embodiment, the first lateral member 213 may include a first lateral surface 213*a* disposed to be parallel to the folding axis (axis A), a second lateral surface 213*b* extending from one end of the first lateral surface 213*a* in a direction perpendicular to the folding axis, and a third lateral surface 213*c* extending from the other end of the first lateral surface 213*a* in a direction perpendicular to the folding axis (axis A).

In an embodiment, when the electronic device 200 is in the unfolded state, the second housing structure 220 is connected with the hinge structure (e.g., hinge structure 264 in FIG. 3) and may include a third surface 221 disposed to face the front surface of the electronic device 200, a fourth surface facing a direction opposite to the third surface 221, and a second lateral surface member 223 surrounding at least a part of a space between the third surface 221 and the fourth surface 222. In an embodiment, the second lateral surface member 223 may include a fourth lateral surface 223*a* disposed to be parallel to the folding axis (axis A), a fifth lateral surface 223*b* extending from one end of the fourth lateral surface 223*a* in a direction perpendicular to the folding axis (axis A), and a sixth lateral surface 223*c* extending from the other end of the fourth lateral surface 223*a* in a direction perpendicular to the folding axis (axis A). In an embodiment, the third surface 221 may face the first surface 211 in the folded state.

In an embodiment, the electronic device 200 may have a recess 201 formed by structural shape-coupling between the first housing structure 210 and the second housing structure 220 so as to receive a display 230 therein. The recess 201 may have substantially the same size as the display 230. In an embodiment, a recess 201 may have two or more different widths in a direction perpendicular to the folding axis (axis A) due to the sensor area 231*d*. For example, the recess 201 may have a first width W1 between a first portion 220*a* parallel to the folding axis (axis A) in the second housing structure 220 and a first portion 210*a* formed at the edge of the sensor area 231*d* in the first housing structure 210, and a second width W2 formed by a second area 220*b* of the second housing structure 220 and a second portion 210*b* which is parallel to the folding axis (axis A) while not corresponding to the sensor area 231*d* in the first housing structure 210. In this case, the second width W2 may be formed to be larger than the first width W1. For example, the recess 201 may be formed to have a first width W1 formed from the first portion 210*a* of the first housing structure 210 to the first portion 220*a* of the second housing structure 220, the first portion 210*a* and first portion 220*a* having asymmetric shapes, and a second width W2 formed from the second portion 210*b* of the first housing structure 210 to the second portion 220*b* of the second housing structure 220, the second portion 210*b* and the second portion 220*b* having symmetric shapes. In an embodiment, the first portion 210*a* and the second portion 210*b* of the first housing structure 210 may be formed to have different distances from the folding axis (axis A). The width of the recess 201 is not limited to the embodiment described above. In various embodiments, the recess 201 may have two or more different widths due to the shape of the sensor area 231d or asymmetrically shaped portions of the first housing structure 210 and the second housing structure 220.

In an embodiment, at least a part of the first housing structure 210 and the second housing structure 220 may be formed of a metal or non-metal material having a selected degree of strength for supporting a display 230.

In an embodiment, the sensor area 231d may be formed to have a predetermined area adjacent to one side corner of the first housing structure 210. However, the disposition, shape, or size of the sensor area 231d is not limited to the embodiment described above. For example, in an embodiment, the sensor area 231d may be provided to a different corner or to an arbitrary area between the upper corner and the lower corner of the first housing structure 210. In an embodiment, the sensor area 231d may be disposed in at least some areas of the second housing structure. In still an embodiment, the sensor area 231d may be disposed to extend in the first housing structure 210 and the second housing structure 220. In an embodiment, the electronic device 200 may include components which perform various functions and are exposed to the front surface of the electronic device 200 through the sensor area 231d or at least one opening formed through the sensor area 231d. In various embodiments, the components may include, for example, at least one of a front surface camera device, a receiver, a proximity sensor, an illuminance sensor, an iris recognition sensor, a ultrasonic sensor, or an indicator.

In an embodiment, the first rear surface cover 240 may be disposed at the second surface 212 of the first housing structure 210 and have a substantially rectangular periphery. In an embodiment, at least a part of the periphery may be surrounded by the first housing structure 210. Similarly, the second rear surface cover 250 may be disposed at the fourth surface 222 of the second housing structure 220 and at least a part of the periphery thereof may be surrounded by the second housing structure 220.

In the described embodiment, the first rear surface cover 240 and the second rear surface cover 250 may have substantially symmetric shapes around the folding axis (axis A).

In an embodiment, the first rear surface cover 240 and the second rear surface cover 250 may include shapes different from each other. In still an embodiment, the first rear surface cover 240 and the first housing structure 210 may be integrally formed and the second rear surface cover 250 and the second housing structure 220 may be integrally formed.

In an embodiment, the first rear surface cover 240, the second rear surface cover 250, the first housing structure 210, and the second housing structure 220 may provide a space in which various components (e.g., printed circuit board, antenna module, sensor module, or battery) of the electronic device 200 may be arranged, through a combined structure thereof. In an embodiment, one or more components may be arranged on the rear surface of the electronic device 200 or may be visually exposed through the rear surface of the electronic device 200. By way of example, one or more of components or sensors may be visually exposed through the first rear area 241 of the first rear surface cover 240. In various embodiments, the sensor may include a proximity sensor, a rear surface camera device, and/or a flash. In an embodiment, at least a part of a sub display 252 may be visually exposed through the second rear area 251 of the second rear surface cover 250.

The display 200 may be disposed in a space formed by the foldable housings (210 and 220). For example, the display 200 may be seated in a recess (e.g., recess 201 in FIG. 2A) formed by the pair of housing structures (210 and 220) and may be disposed to occupy substantially most of the front surface of the electronic device 200. Accordingly, the front surface of the electronic device 200 may include the display 230, and an area (e.g., peripheral area) of the second housing structure 220 and an area (e.g., peripheral area) of the first housing structure 210 adjacent to the display 230. In an embodiment, the rear surface of the electronic device 200 may include the first rear surface cover 240, an area (e.g., peripheral area) of the first housing structure 210 adjacent to the first rear surface cover 240, the second rear surface cover 250, and an area (e.g., peripheral area) of the second housing structure 220 adjacent to the second rear surface cover 250.

In an embodiment, the display 230 may refer to a display of which at least a part is transformable to a flat surface or a curved surface. In an embodiment, the display 230 may include a folding area 231c, a first area 231a disposed at one side of the folding area 231c (e.g., right side area of folding area 231c), and a second area 231b disposed at the other side thereof (e.g., left area of folding area 231c). For example, the first area 231a may be disposed at the first surface 211 of the first housing structure 210 and the second area 231b may be disposed at the third surface 221 of the second housing structure 220. In an embodiment, the division of areas is exemplary and the display 230 may be divided into multiple areas (e.g., two or more than four) according to the structure or function thereof. By way of example, in the embodiment shown in FIG. 2A, the area of the display 230 may be divided by the folding axis (axis A) or the folding area 231c extending parallel with axis y, and in an embodiment, the area of the display 230 may be divided by another folding area (e.g., folding area parallel with axis x) or another folding axis (e.g., folding axis parallel with axis x). The aforementioned area division of the display is a mere physical division by the pair of housing structures (210 and 220) and the hinge structure (e.g., hinge structure 264 in FIG. 3). The display may actually display a whole screen through the pair of housing structures (210 and 220) and the hinge structure (e.g., hinge structure 264 in FIG. 3). In an embodiment, the first area 231a and the second area 231b may have shapes generally symmetric to each other around the folding area 231c. However, the first area 231a, unlike the second area 231b, may include a cut notch area (e.g., notch area 233 in FIG. 3) depending on the presence of the sensor area 231d, but other area of the first area 231a may have a symmetric shape to the second area 231b. For example, the first area 231a and the second area 231b may have parts symmetrical to each other and parts asymmetrical to each other.

Figure 3:
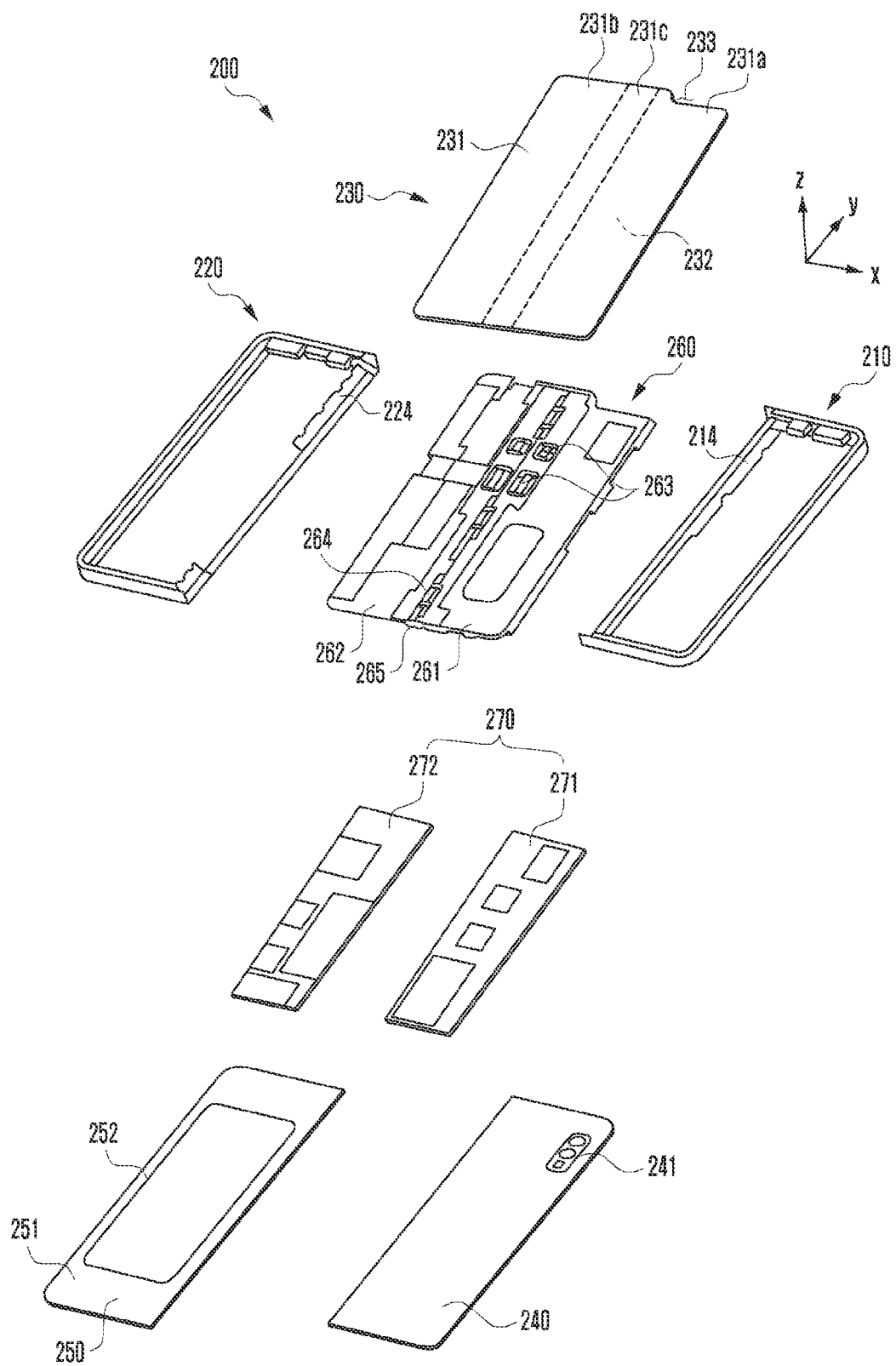
FIG. 3 is an exploded perspective view illustrating an electronic device according to various embodiments.

Referring to FIG. 2B, the hinge cover 265 may be interposed between the first housing structure 210 and the second housing structure 220 and configured to cover an inner component (e.g., hinge structure 264 in FIG. 3). In an embodiment, the hinge cover 265 may be covered or exposed by a part of the first housing structure 210 and the second housing structure 220 according to an operation state (unfolded state (flat state) or folded state) of the electronic device 200.

By way of example, as shown in FIG. 2A, when the electronic device 200 is in the unfolded state, the hinge cover 265 may be covered by the first housing structure 210 and the second housing structure 220 so as not to be exposed. By way of example, as shown in FIG. 2B, when the electronic device 200 is in the folded state (e.g., completely folded state), the hinge cover 265 may be exposed outside between the first housing structure 210 and the second housing structure 220. By way of example, when the electronic device 200 is in the intermediate state in which the first housing structure 210 and the second housing structure 220 are folded with a certain angle, the hinge cover 265 may be partially exposed to the outside of the electronic device 200 between the first housing structure 210 and the second housing structure 220. In this case, the exposed area may be smaller than that of the completed folded state. In an embodiment, the hinge cover 265 may include a curved surface.

Hereinafter, an operation of the first housing structure 210 and the second housing structure 220 and each area of the display 230 according to an operation state (e.g., unfolded state (flat state) and folded state) of the electronic device 200 will be described.

In an embodiment, when the electronic device 200 is in the unfolded state (flat state) (e.g., state in FIG. 2A), the first housing structure 210 and the second housing structure 220 may be at 180 degrees and the first area 231a and the second area 231b of the display are arranged to face the same direction. The folding area 231c may form the same plane with the first area 231a and the second area 231b.

In an embodiment, when the electronic device 200 is in the folded state (e.g., state in FIG. 2B), the first housing structure 210 and the second housing structure 220 may be arranged to face each other. The first area 231a and the second area 231b of the display 230 may be at a narrow angle (e.g., 0 degrees to 10 degrees) therebetween while facing each other. At least a part of the folding area 231c may be formed to be a curved surface having a certain curvature.

In an embodiment, when the electronic device 200 is in the intermediate state, the first housing structure 210 and the second housing structure 220 may be arranged at a certain angle. The first area 231a and the second area 231b of the display 230 may form an angle lager than that of the folded state and smaller than that of the unfolded state. At least a part of the folding area 231c may be formed to be a curved surface having a certain curvature, and in this case, the curvature may be smaller than that of the folded state.

FIG. 3 is an exploded perspective view illustrating an electronic device 200 according to various embodiments.

Referring to FIG. 3, in an embodiment, the electronic device 200 may include a display 230, a bracket assembly 260, at least one printed circuit board 270, a first housing structure 210, a second housing structure 220, a first rear surface cover 240, and a second rear surface cover 250. In the disclosure, the display (display unit) 230 may be referred to as a display module or a display assembly.

The display 230 may include a display panel 231 (e.g., flexible display panel) and at least one plate 232 or layer seated on the display panel 231. In an embodiment, the plate 232 may be disposed between the display panel 231 and the bracket assembly 260. The display panel 231 may be disposed in at least a part of one surface of the plate 232 (e.g., surface in Z direction in FIG. 3). The plate 232 may be formed to have a shape corresponding to the display panel 231. For example, some area of the plate 232 may be formed to have a shape corresponding to a notch area 233 of the display panel 231.

The bracket assembly 260 may include a first bracket 261, a second bracket 262, a hinge structure 264 interposed between the first bracket 261 and the second bracket 262, a hinge cover 265 which covers the hinge structure 264 when seen from the outside, and a wire member 263 (e.g., flexible printed circuit board (FPCB)) passing through the first bracket 261 and the second bracket 262.

In an embodiment, the bracket assembly 260 may be disposed between the plate 232 and at least one printed circuit board 270. By way of example, the first bracket 261 may be disposed between a first printed circuit board 271 and a first area 231a of the display 230. The second bracket 262 may be disposed between a second printed circuit board 272 and a second area 231b of the display 230.

In an embodiment, at least a part of the hinge structure 264 and the wire member 263 may be disposed in the bracket assembly 260. The wire member 263 may be disposed in a direction (e.g., axis x direction) across the first bracket 261 and the second bracket 262. The wire member 263 may be disposed in a direction (e.g., axis x direction) perpendicular to a folding axis (e.g., axis y or folding axis A in FIG. 1) of a folding area 231c.

At least one printed circuit board 270 may include, as described above, a first printed circuit board 271 disposed at a first bracket 261 side, and a second printed circuit board 272 disposed at a second bracket 262 side. The first printed circuit board 271 and the second printed circuit board 272 may be disposed in a space formed by the first housing structure 210, the second housing structure 220, the first rear surface cover 240, and the second rear surface cover 250. Components for implementing various functions of the electronic device 200 may be mounted to the first printed circuit board 271 and the second printed circuit board 272.

In an embodiment, the first housing structure 210 and the second housing structure 220 may be assembled to be coupled to opposite ends of the bracket assembly 260 in a state in which the bracket assembly 260 is coupled to the display 230. As described below, the first housing structure 210 and the second housing structure 220 may slide from the opposite ends of the bracket assembly 260 so as to be coupled to the bracket assembly 260.

In an embodiment, the first housing structure 210 may include a first rotation support surface 214 and the second housing structure 220 may include a second rotation support surface 224 corresponding to the first rotation support surface 214. The first rotation support surface 214 and the second rotation support surface 224 may each include a curved surface corresponding to the curved surface included in the hinge cover 265.

In an embodiment, when the electronic device 200 is in an unfolded state (e.g., state in FIG. 2A), the first rotation support surface 214 and the second rotation support surface 224 may cover the hinge cover 265 so that the hinge cover 265 is not exposed or exposed at a minimum to the rear surface of the electronic device 200. In an embodiment, when the electronic device 200 is in a folded state (e.g., state in FIG. 2B), the first rotation support surface 214 and the second rotation support surface 224 may rotate along the curved surface included in the hinge cover 265 so that the hinge cover 265 is fully exposed to the rear surface of the electronic device 200.

The electronic device according to various embodiments disclosed herein may be an in-folding type foldable electronic device as shown in FIG. 2A, 2B and FIG. 3 and may be an out-folding type foldable electronic device. The in-folding type may refer, for example, to the flexible display being folded inward, and the out-folding type may refer, for example, to the flexible display being folded outward.

Figure 4:
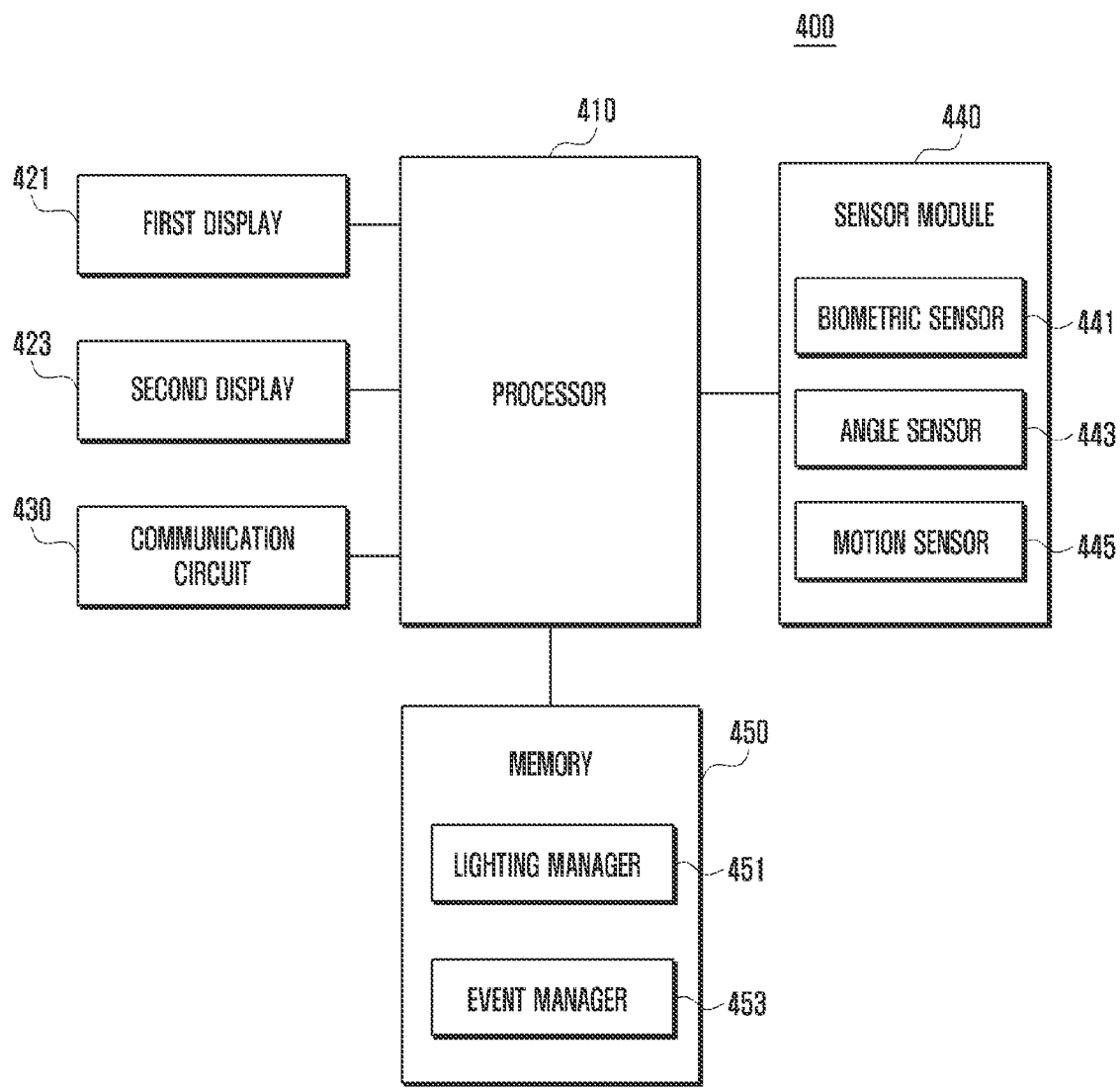
FIG. 4 is a block diagram illustrating an example configuration of an electronic device according to various embodiments.

FIG. 4 is a block diagram illustrating an example configuration of an electronic device according to various embodiments.

Referring to FIG. 4, the electronic device 400 (e.g., electronic device 101 in FIG. 1 or electronic device 200 in FIG. 2A) according to various embodiments may include a processor (e.g., including processing circuitry) 410 (e.g., processor 120 in FIG. 1), a first display 421 (e.g., display 160 in FIG. 1), a second display 423 (e.g., display 160 in FIG. 1), a communication circuit 430 (e.g., communication module 190 in FIG. 1), a sensor module 440 (e.g., sensor module 176 in FIG. 1), and/or a memory 350 (e.g., memory 130 in FIG. 1). Some of the configuration shown in FIG. 4 may be omitted or substituted.

According to various embodiments, the electronic device 400 may include a foldable housing (not shown) and each component of the electronic device 400 may be disposed in the foldable housing or exposed to outside through at least a part of the foldable housing. The foldable housing according to various embodiments may include a hinge structure (e.g., hinge structure 264 in FIG. 3), a first housing structure (e.g., first housing structure 210 in FIG. 2A) connected to the hinge structure and including a first surface facing a first direction and a second surface facing a second direction opposite to the first direction, and a second housing structure (e.g., second housing structure 220 in FIG. 2A) connected to the hinge structure, including a third surface facing a third direction and a fourth surface facing a fourth direction opposite to the third direction, and folded toward the first housing structure around the hinge structure. In the foldable housing, for example, the third direction may be opposite to the first direction in a folded state and the third direction may be the same as the first direction in an unfolded state. For example, when the electronic device 400 is an in-folding type foldable electronic device 400, in the foldable housing, the first surface faces the third surface in the folded state, and the third direction is the same as the first direction in the unfolded state. For example, when the electronic device 400 is an out-folding type foldable electronic device 400, in the foldable housing, the second surface faces the fourth surface in the folded state, and the third direction is the same as the first direction in the unfolded state.

According to various embodiments, the processor 410 may include at least a part of the configuration and/or function of the processor 120 in FIG. 1 as a configuration for controlling each component of the electronic device 400 and/or performing operations of data processing with respect to communication.

The processor 410 may include various processing circuitry and be operatively connected, for example, to components of the electronic device 400.

According to various embodiments, the first display 421 and the second display 423 may display various screens and graphic interfaces, based on the control of the processor 410.

According to various embodiments, the first display 421 may be a main display and the second display 423 may be a sub-display. According to various embodiments, the second display 423 may be implemented in a surface different from the first display 421.

According to various embodiments, the first display 421 may be a flexible display implemented with a flexible material having properties of easy bendability. According to various embodiments, the first display 421 may support a full-screen mode or divided screen mode. The full-screen mode may be, for example, a display mode for displaying information without dividing a screen of the first display 421. The divided screen mode may be, for example, a display mode wherein a screen of the first display 421 is divided into multiple parts and different information is displayed in each of the divided parts thus formed.

According to various embodiments, the flexible display, which is merely one type of display, may refer to a display that normally performs operations of the electronic device 400 while being physically transformable by the force from the outside. The same may be referred to as a foldable display, a bendable display, or a rollable display. As such, a user of the electronic device 400 can fold, bend, or roll the flexible display. Hereinafter, the folding, bending, or rolling of the electronic device 400 may be substituted with another expression as described above. According to various embodiments, the flexible display may be an in-folding type flexible display or an out-folding type flexible display.

According to various embodiments, the flexible display may be visible through the first surface of the first housing structure and the third surface of the second housing structure. For example, the flexible display may extend from the first surface of the first housing structure to the third surface of the second housing structure.

According to various embodiments, the second display 423 may be visible through a surface opposite to the surface through which the first display 421 is visible. According to various embodiments, the same may be exposed through the second surface of the first housing structure and the fourth surface of the second housing structure.

According to various embodiments, the communication circuit 430 may establish a communication channel with an external electronic device and transmit and/or receive various data to/from the external electronic device. According to various embodiments, the communication circuit 430 may be configured to include a cellular communication module to be connected to a cellular network (e.g., 3G, LTE, 5G, Wibro, or Wimax). According to various embodiments, the communication circuit 430 may be configured to include a near field communication module to perform data transmission and/or reception with an external electronic device using a near field communication (e.g., Wi-Fi, Bluetooth, Bluetooth Low Energy (BLE), UWB, and NFC), but is not limited thereto.

According to various embodiments, the sensor module 440 may have a configuration to detect the operation state of the electronic device 400 or an external environment state and generate an electric signal or data value in response to the detected state and may have at least a part of the configuration or function of the sensor module 176 in FIG. 1. According to various embodiments, the sensor module 440 may include at least one of an angle sensor 443, a motion sensor 445, a biometric sensor 441, and an optical sensor (not shown). The angle sensor 443 may measure an angle between the first housing structure and the second housing structure of the foldable housing when, for example, the electronic device 400 including the foldable housing performs the folding operation. The angle sensor 443 may include, for example, a Hall sensor and a magnet. For example, the Hall sensor may be disposed in the first housing structure and the magnet may be disposed in the second housing structure, and the folding state of the electronic device 400 can be measured based on the measurement value of the Hall sensor. The angle sensor 443 may detect, for example, the folding and unfolding operation of the electronic device 400. The motion sensor 445 may detect, for example, the folded and unfolded state of the electronic device. The motion sensor 445 may include, for example, at least one of a gyro sensor or an acceleration sensor. The biometric sensor 441 may analyze, for example, user biometric information. The biometric sensor 441 may include, for example, at least one of an optical fingerprint sensor, a ultrasonic fingerprint sensor, an iris sensor, an HMD sensor, an ECG sensor, and a vein sensor. The optical sensor may detect, for example, user movements by measuring an external illuminance.

According to various embodiments, the electronic device 400 may support a wake-up mode in which a user can intensively use the main functions of the electronic device 400 and a sleep mode waiting for user's use. In the sleep mode, the electronic device 400 may deactivate various hardware modules and/or software modules included in the electronic device 400, or may be operated with minimum power so as to perform designated and limited functions thereof. According to various embodiments, the electronic device 400 may display, in the sleep mode, pre-configured information (e.g., time information, date, weather, etc.) in the first display 421. In this case, the electronic device 400 may display the pre-configured information with a designated color using a pre-configured pixel and set a designated color (e.g., black) to remaining pixels.

The electronic device 400 according to various embodiments may display a user interface in an area of the first display 421 or the second display 423.

According to various embodiments, the processor 410 may control the electronic device 400 to display a user interface in at least one of edge area (peripheral area) of the first display 421 or at least one of the folding areas. The at least one edge area may refer, for example, areas spaced apart from the periphery of the first display 421 by a predetermined interval. For example, the at least one edge area may include areas spaced apart from an upper corner, a left corner, a right corner, and a lower corner of the display 421 by a predetermined interval. According to various embodiments, the folding area may be an area including a folding line or a bending line generated by the folding of the first display 421. The folding area may include, for example, a space spaced apart, by a predetermined interval, from the folding line or the bending line generated when the first display 421 is folded. The folding area may include, for example, a first folding area spaced apart, by a predetermined interval, to the left side and a second folding area spaced apart, by a predetermined interval, to the right side, based on the folding line.

The memory 423 according to various embodiments may store instructions for an operation of the processor. The memory 423 may store, for example, a program including a lighting manager 451 and an event manager 453.

According to various embodiments, the processor 410 may load, in the memory 423, a command or data received from another component of the electronic device 400, process the command and data stored in the memory 423, and store result data. The processor 410 may execute the program stored in the memory 423.

According to various embodiments, the event manger 453 may detect an event occurrence and, based on the event that has occurred, determine at least one area included in the first display 421 as an area for displaying a user interface. For example, the event manger 453 may determine, according to a type of the event that has occurred, at least one area included in the first display 421 as an area for displaying a user interface. An event configured to display a user interface may include, for example, at least one of a message reception event, a call reception event, an application update event, or a user authentication event. The event configured to display a user interface may include, for example, an angle change event between the first housing structure and the second housing structure of the foldable housing. According to various embodiments, the event configured to cause the electronic device 400 to display a user interface is not limited aforementioned events and may include all kinds of event which can provide notification to a user.

According to various embodiments, the lighting manager 451 may determine a display start point or a display direction of the user interface, based on the event identified by the event manager 453. The lighting manager 451 may determine, for example, a property of the user interface, based on a type or content of the event identified through the event manager 453.

According to various embodiments, the processor 410 may display the user interface, based on the event occurrence. The processor 410 may vary a display order and location of the user interface according to a type or content of the event.

The processor 410 according to various embodiments may generate an animation effect such as the user interface moving along the edge area of the first display 421. The processor 410 may configure a display start point and end point of the user interface and indicate same. In some cases, the user interface may additionally include an indicator.

The user interface according to various embodiments may, for example, and without limitation, have a form of a line or a plane. The processor 410 may display the user interface brighter than peripheral areas thereof. The user interface may be adjusted variously in length. A shape of the start point of the user interface may be various, including a circle, square, triangle, or arrow shape. The processor 410 may impart, for example, a gradation effect when displaying the user interface.

The processor 410 according to various embodiments may adjust a property of the user interface. Information on properties of the user interface may include, for example, at least one of a user interface shape (e.g., line or plane), a user interface color (e.g., tone, saturation, or brightness), a user interface color effect (e.g., gradation effect or flickering effect), a user interface moving manner (e.g., moving by controlling pixel values or moving by continuously displaying a plurality of images), a user interface moving direction (e.g., clockwise direction or counterclockwise direction), a user interface moving velocity, a user interface displaying time, a time which elapses until re-displaying the user interface after the user interface is displayed in the entirety of the first display 421 or the second display 423, or a start point and end point of the user interface. According to various embodiments, the processor 410 may display the user interface while changing at least one of tone, saturation, brightness, or transparency of at least a part of the user interface.

According to various embodiments, the processor 410 may detect whether an event configured to display a user interface has occurred.

According to various embodiments, the processor 410 may determine a property of the user interface, based on a type of the event that has occurred.

According to various embodiments, the processor 410 may identify a physical reformation of the first display 421 through the sensor module 440 in response to the occurrence of the event configured to display the user interface. For example, the processor 410 may identify an angle between the first housing structure and the second housing structure of the foldable housing through the sensor module 440 (e.g., angle sensor 443).

According to various embodiments, the processor 410 may determine at least one area for displaying the user interface from among at least one edge area or folding area of the first display 421, based on the angle between the first housing structure and the second housing structure.

According to various embodiments, the processor 410 may control the first display 421 to display the user interface in the determined at least one area.

According to various embodiments, the processor 410 may determine a property of the user interface to be displayed, based on a type of the event that has occurred. For example, the processor 410 may determine a property of the user interface, based on a type of the event or a content included in the event. When a message reception event occurs, the processor 410 may identify, for example, a content of the message reception event. The processor 410 may display user interfaces having different properties depending on a case where a message from a user of whom contact information has been registered and a case where a message from a user of whom contact information has not been registered.

According to various embodiments, the processor 410 may detect the folding operation or unfolding operation of the electronic device 400 and continuously identify an angle change, according to the folding operation or unfolding operation, between the first housing structure and the second housing structure. The processor 410 may continuously identify angle changes between the first housing structure and the second housing structure, for example, from the start point of angle change event between the first housing structure and the second housing structure to the end point of the angle change event. The processor 410 may continuously change, for example, based on the identified angle change, an area for displaying the user interface.

According to various embodiments, the processor 410 may display the user interface in an area in at least one of the first display 421 or the second display 423.

As such, the electronic device 400 may provide various notification effects to a user using the user interface displayed in an area of the display.

Hereinafter, FIGS. 5, 6, 7A, 7B, 7C, 8, 9, 10, 11 and 12 (which may be referred to hereinafter as FIGS. 5 to 12) show various examples of displaying a user interface in an out-folding type foldable electronic device 400, and FIGS. 13A, 13B, 14A, 14B, 14C and 14D (which may be referred to hereinafter as FIGS. 13A to 14D) show various examples of displaying a user interface in an in-folding type foldable electronic device 400.

Figure 5:
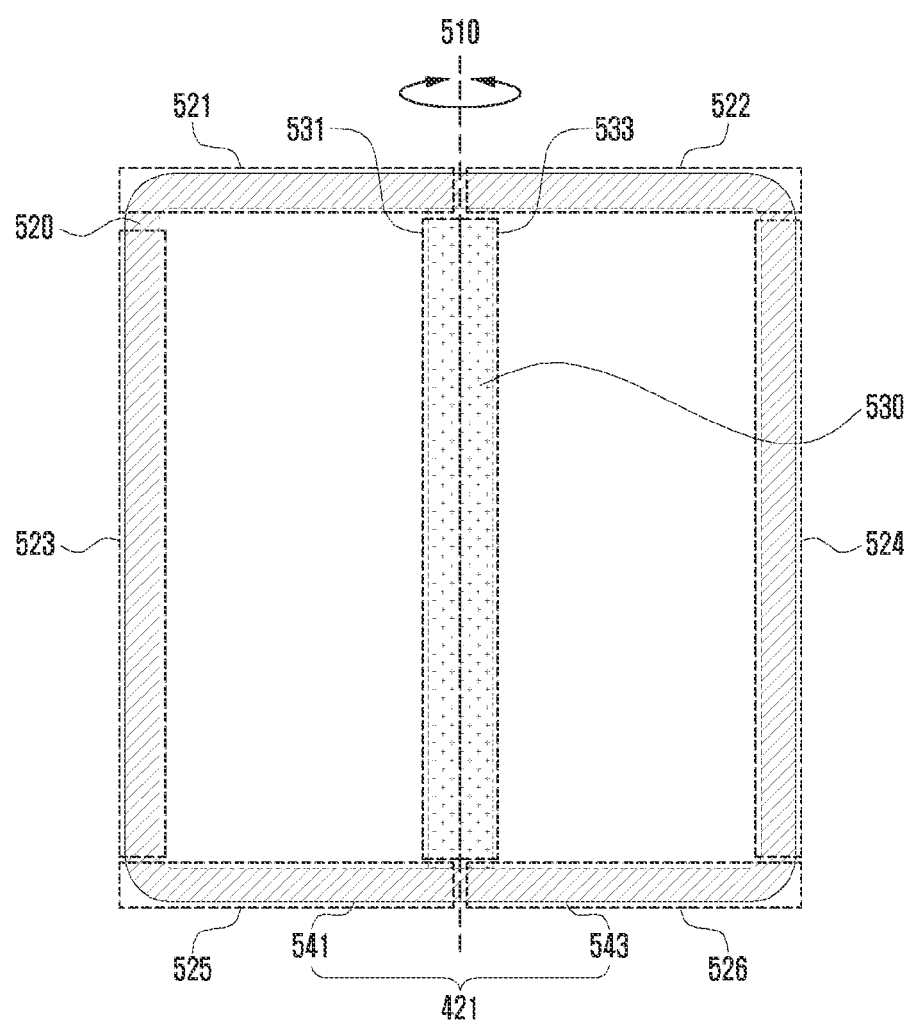
FIG. 5 is a diagram illustrating an area in which a user interface may be displayed in an electronic device according to various embodiments.

FIG. 5 is a diagram illustrating an area in which a user interface may be displayed in an electronic device according to various embodiments.

Referring to FIG. 5, a processor 410 of an electronic device 400 according to various embodiments may display a user interface through a first display 421. The first display 421 of the electronic device 400 may be folded by a force or pressure applied from the outside. The first display 421 may be exposed through, for example, a first surface of a first housing structure and a third surface of a second housing structure of a foldable housing of the electronic device 400, and may be also folded or unfolded around a folding axis 510 of the first display 421 according to a folding operation or unfolding operation of the foldable housing.

The processor 410 according to various embodiments may display a user interface in at least one area of an edge area 520 or a folding area 530 of the first display 421. The edge area 520 may be a part of a periphery of the first display 421. For example, the edge area 520 may be an area which includes space spaced apart from an upper end corner, a left corner, a right corner, and a lower end corner of the first display 421 by a predetermined interval as shown in FIG. 5. The folding area 530 may be an area which includes a space spaced apart from the folding axis 510 by a predetermined interval when the first display 421 is folded along the folding axis 510.

According to various embodiments, the first display 421 may be divided into a first display area 541 and a second display area 543 based on the folding axis 510. The first display area 541 of the first display 421 may include a first edge area 521 disposed at a left upper end corner, a second edge area 523 disposed at a left lateral corner, a third edge area 525 disposed at a left lower end corner, and a first folding area 531. The second display area 543 of the first display 421 may include a fourth edge area 522 disposed at a right upper end corner, a fifth edge area 524 disposed at a right lateral corner, a sixth edge area 526 disposed at a right lower end corner, and a second folding area 533.

According to various embodiments, when the electronic device 400 operates in an unfolded state, the processor 410 may determine the first to sixth edge areas (521, 522, 523, 524, 525, and 526) as an area for displaying a user interface.

According to various embodiments, when the electronic device 400 operates in a folded state, one of the first display area 541 or the second display area 543 may be used as an area for displaying a user interface. When the first display area 541 of the display 421 is used, the processor 410 may determine the first edge area 521, the second edge area 523, the third edge area 525, and the first folding area 531 of the first display area 541 as an area for displaying a user interface. When the second display area 543 of the first display 421 is used, the processor 410 may determine the fourth edge area 522, the fifth edge area 524, the sixth edge area 526, and the second folding area 533 of the second display area 543 as an area for displaying a user interface.

Figure 6:
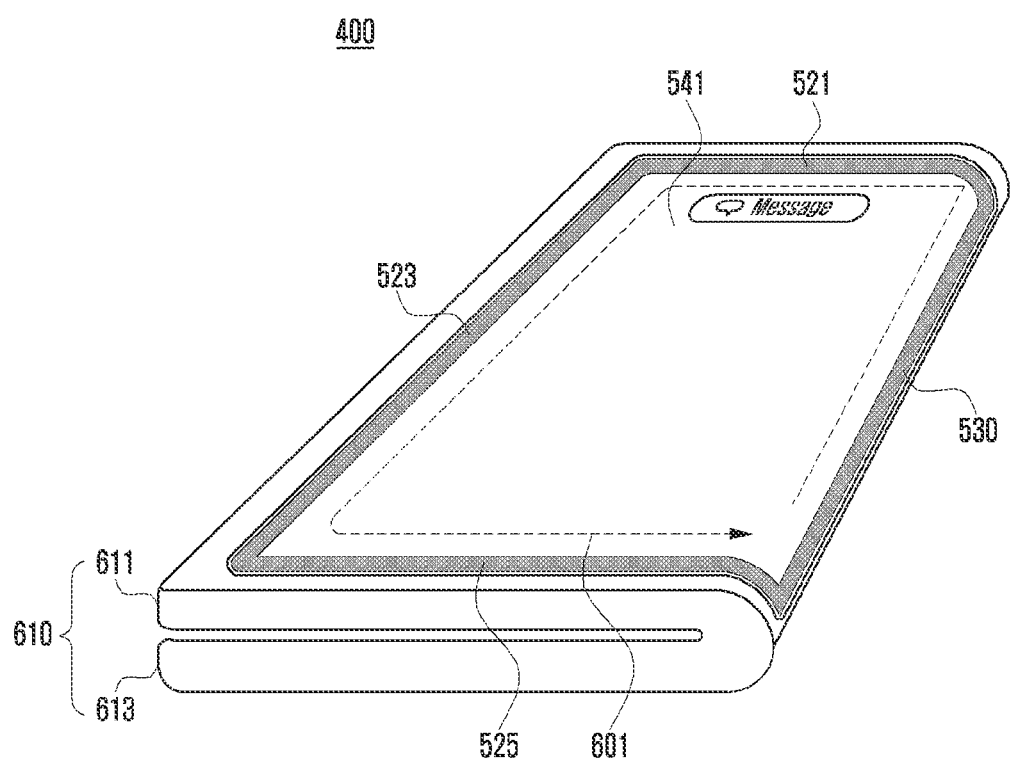
FIG. 6 is a perspective view illustrating an example of displaying a user interface when an electronic device is in a folded state according to various embodiments.

FIG. 6 is a diagram illustrating an example of displaying a user interface in a folded state of an electronic device according to various embodiments.

Referring to FIG. 6, an electronic device 400 may be folded by an external force and FIG. 6 shows a folded state of the electronic device 400. The folded state may refer, for example, to a case where the angle between a first housing structure 611 and a second housing structure 613 of a foldable housing 610 of the electronic device 400 is 0 degrees.

A processor 410 according to various embodiments may detect whether an event configured to display a user interface has occurred. The processor 410 may detect, for example, at least one of a message reception event, a call reception event, an application update event, or a user authentication event.

The processor 410 according to various embodiments may identify a folding state of the electronic device 400. The processor 410 may identify an angle between the first housing structure 611 and the second housing structure 613 through, for example, a sensor module 440.

According to various embodiments, when the electronic device 400 is in the folded state, that is, the angle between the first housing structure 611 and the second housing structure 613 is 0 degrees, the processor 410 may determine a first edge area 521, a second edge area 523, a third edge area 525, and a folding area 530 of the first display area 421 (first folding area 531 of first display area 421 and second folding area 533 of second display area 543) as an area for displaying a user interface. In the case of the electronic device 400 in the folded state, the first folding area 531 and the second folding area 533 may correspond to a curved portion of the first display 421.

According to various embodiments, the processor 410 may display the user interface in the determined area. According to various embodiments, the processor 410 may simultaneously display the user interface in the determined whole area. The processor 410 may provide, to a user, a flickering effect of the user interface in the determined area. According to various embodiments, the processor 410 may provide, to a user, an animation effect such as the user interface moving in a clockwise direction or/and counter-clockwise direction 601 in the determined area. According to various embodiments, the processor 410 may variously configure a start point and moving direction of the user interface. The processor 410 may differently configure a start point and moving direction of the user interface, for example, based on a type of the event that has occurred.

Figure 7A:
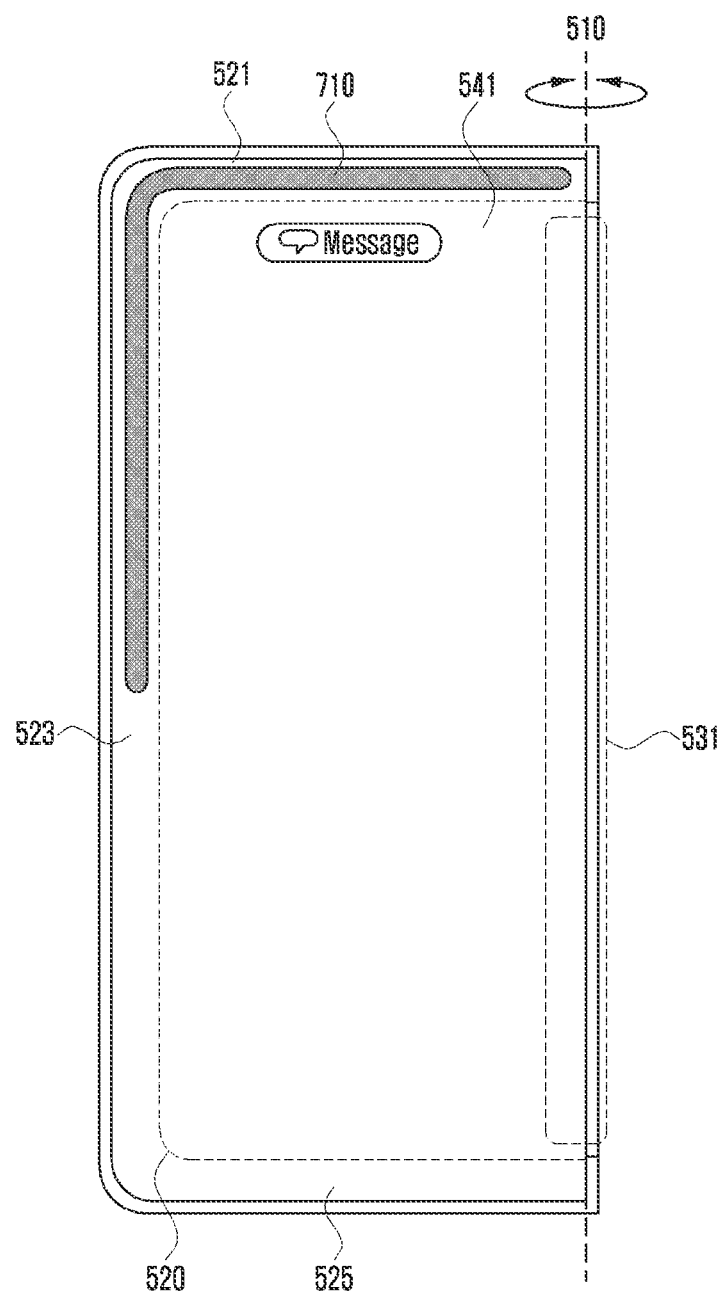
FIGS. 7A, 7B and 7C are diagrams illustrating example methods for displaying a user interface in an electronic device according to various embodiments.
Figure 7B:
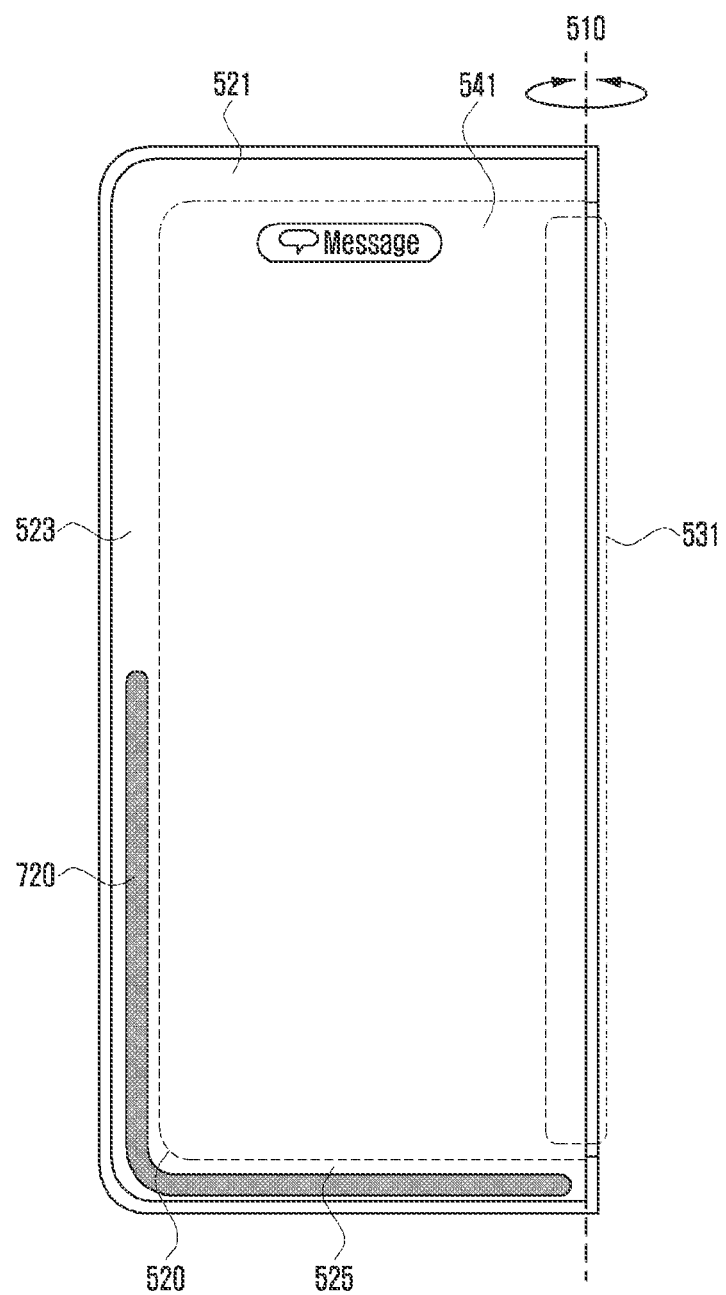
Figure 7C:
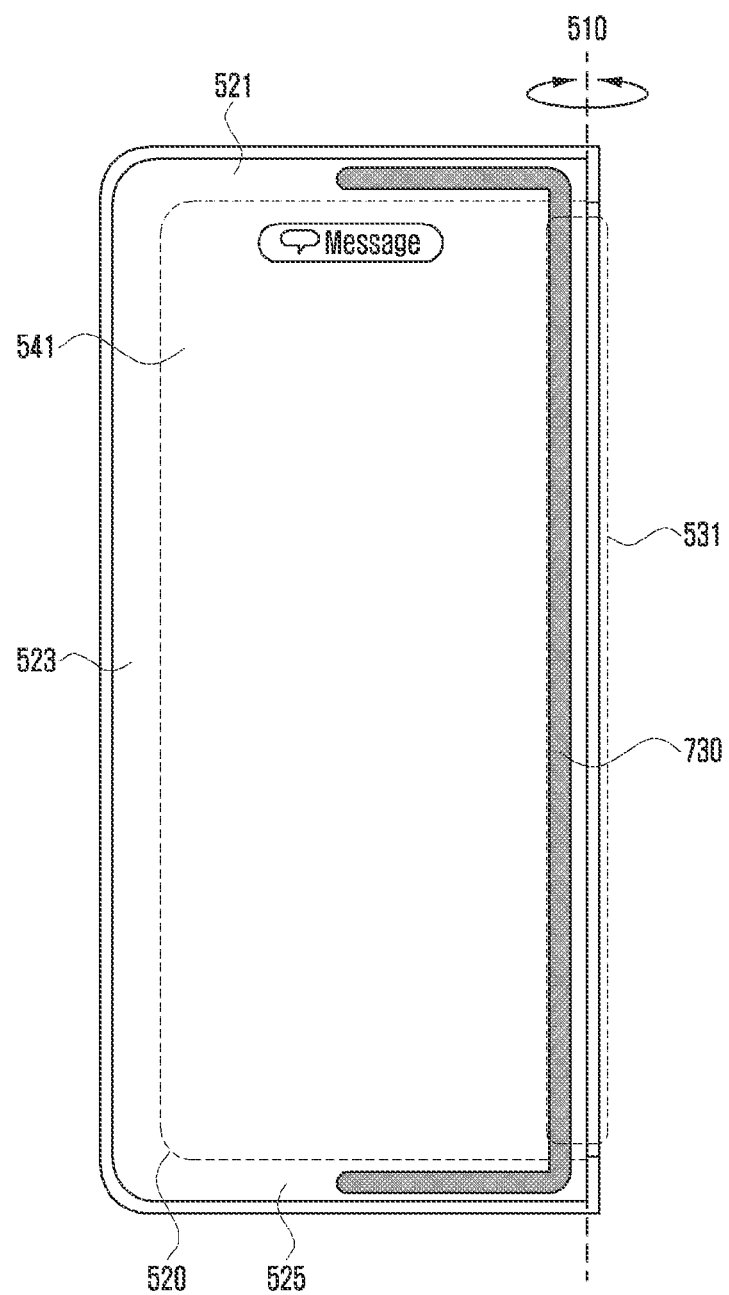

FIGS. 7A, 7B and 7C are diagrams illustrating example methods for displaying a user interface in an electronic device 400 according to various embodiments disclosed herein.

FIGS. 7A, 7B and 7C are diagrams illustrating situations in which the user interface is displayed according to an event (e.g., message reception event) occurrence when an electronic device according to various embodiments is in a folded state.

The description overlapping with those described referring to FIG. 6 may not be repeated here.

Referring to FIG. 7A, when the electronic device 400 is in the folded state, the processor 410 according to various embodiments may determine a first edge area 521 and a second edge area 523 of the first display area 541 of the first display 421 as an area for displaying a user interface 710. As shown in FIG. 7A, the processor 410 may display the user interface 710 only in the first edge area 521 and the upper end of the second edge area 523.

Referring to FIG. 7B, when the electronic device 400 is in the folded state, the processor 410 according to various embodiments may determine a second edge area 523 and a third edge area 525 of the first display area 541 of the first display 421 as an area for displaying a user interface 720. As shown in FIG. 7B, the processor 410 may display the user interface 720 only in the third edge area 525 and the lower end of the second edge area 523.

Referring to FIG. 7C, when the electronic device 400 is in the folded state, the processor 410 according to various embodiments may determine a first edge area 521, a third edge area 525, and a first folding area 531 of the first display area 541, and a second folding area 533 (not shown) of a second display area 543 of the first display 421 as an area for displaying a user interface 730. As shown in FIG. 7C, the processor 410 may display the user interface 730 in the right portion of the first edge area 521, the right portion of the third edge area 525, the first folding area 531, and the second folding area 533. Although not shown in FIG. 7C which is a plane view of the electronic device 400, as for the above case, the user interface 730 may be also displayed in the folding area 533 of the second display area 543.

According to various embodiments, the processor 410 may display the user interface 710 in the first edge area 521 and the upper end of the second edge area 523 as shown in FIG. 7A, then, after pre-configured time elapses, display the user interface 720 in the lower end of the second edge area 523 and the third edge area 525 as shown in FIG. 7B, and then, after a pre-configured time elapses again, display the user interface 730 in the right portion of the third edge area 525, the first folding area 531, the second folding area 533, and the right portion of the first edge area 521. According to the manner described above, the electronic device 400 may provide a user with an animation effect that the user interface moves from the first edge area 521 to the first folding area 531 in a counterclockwise direction.

According to various embodiments, the processor 410 may display the user interface in the first edge area 521, may then display the user interface in the second edge area 523 as well after a preconfigured time has elapsed, may then display the user interface in the third edge area 525 as well after a preconfigured time has elapsed, and then may display the user interface in the first folding area 531 and the second folding area 533 as well after a preconfigured time has elapsed. According to the manner described above, the electronic device 400 may provide a user with an extension effect that the user interface extends from the first edge area 521 to the first folding area 531 and the second folding area 533 in the counterclockwise direction.

The animation effect such that the user interface extends or moves may be achieved through various methods. For example, the electronic device 400 may adjust, using a drive circuit for the first display 421, a luminance, hue, on/off, and displaying time of a certain point of the first display 421, thus achieving the animation effect such as the moving user interface. According to an embodiment, the electronic device 400 may consecutively display a user interface image having a changing displaying location in the first display 421, and thus give an animation effect of the moving user interface.

According to various embodiments, when the user interface is displayed, the electronic device 400 may impart a gradation effect by changing saturation and brightness of the user interface, thereby increasing the animation effect such as the moving or extending user interface. According to various embodiments, the electronic device 400 may employ multiple colors according to the length of the user interface. The electronic device 400, for example, may configure the user interface to have three colors when the length of the displayed user interface is equal to or more than a designated first length, to have two colors when the length of the displayed user interface is equal to or more than a designated second length and less than the designated first length, and to have one color when the length of the displayed user interface is less than the designated second length.

In addition, the electronic device 400 may variously configure the speed of displaying the user interface which is consecutively displayed from the first edge area 521 to the second edge area 523. For example, the electronic device 400 may display the user interface in the first edge area 521, and then after one second, display the user interface in the first edge area 521 and the second edge area 523.

The time interval by which the electronic device 400 displays the user interface may be changed by a user configuration. Furthermore, the time interval may vary according to a type of the event that has occurred.

Figure 8:
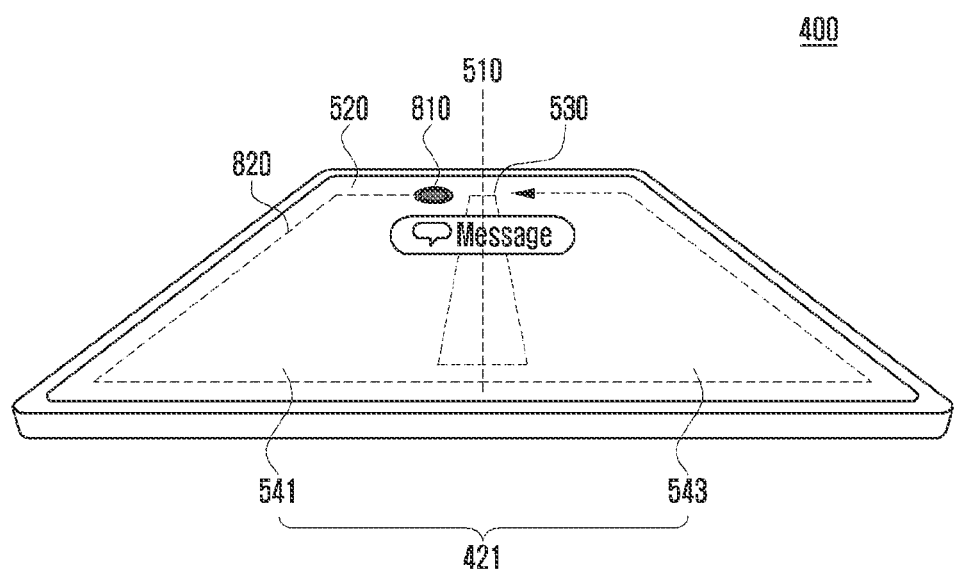
FIG. 8 is a perspective view illustrating an example of displaying a user interface in an electronic device according to various embodiments.
Figure 8:
Figure 8:
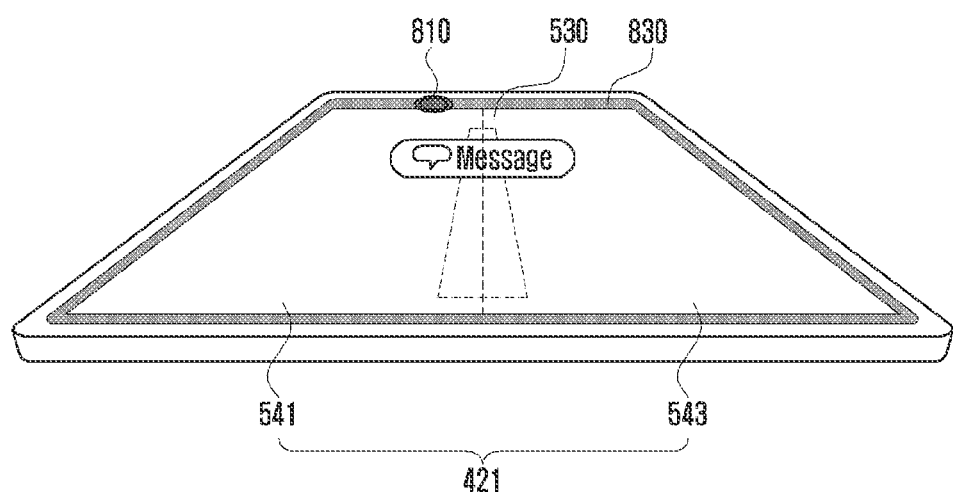

FIG. 8 is a perspective view illustrating an example of displaying a user interface in an electronic device according to various embodiments.

FIG. 8 is a view illustrating an example of displaying the user interface according to an event (e.g., message reception event) occurrence when the electronic device 400 according to various embodiments is in an unfolded state. The unfolded state may refer, for example, a case where an angle between a first housing structure 611 and a second housing structure 613 of a foldable housing 610 of the electronic device 400 is 180 degrees. According to various embodiments, when the electronic device 400 is in the unfolded state, the first housing structure 611 and the second housing structure 613 may form a plane structure. In the unfolded state, both of a first display area 541 and a second display area 543 of a first display 421 may be used.

Referring to FIG. 8, a processor 410 according to various embodiments may detect whether an event configured to display the user interface 830 has occurred.

The processor 410 may detect, for example, at least one of a message reception event, a call reception event, an application update event, or a user authentication event.

The processor 410 according to various embodiments may identify a folding state of the electronic device 400. The processor 410 may identify an angle between the first housing structure 611 and the second housing structure 613 through, for example, a sensor module 440.

According to various embodiments, when the electronic device 400 is in the unfolded state, that is, the angle between the first housing structure 611 and the second housing structure 613 is 180 degrees, the processor 410 may determine all edge areas 520 of the first display 421 as an area for displaying the user interface 830. The processor 410 may determine the first edge area 521, the second edge area 523, the third edge area 525 of the first display area 541, and the fourth edge area 522, the fifth edge area 524, and the sixth edge area 526 of the second display area 543 of the first display 421 as an area for displaying the user interface 830.

According to various embodiments, the processor 410 may display the user interface 830 in the determined edge area 520.

According to various embodiments, the processor 410 may configure the moving direction 820 to a clockwise direction or/and a counterclockwise direction having a start point 810 which is a certain point included in the first edge area 521 so as to display the user interface 830 like the case in which the same moves to move along a counterclockwise direction. For example, the processor 410 may display the user interface the user interface like the case in which the same consecutively moves from the first edge area 521 to fourth edge area 522 via the second edge area 523, the third edge area 525, the sixth edge area 526, and the fifth edge area 524. According to various embodiments, the processor 410 may variously configure a start point and moving direction of the user interface 830. The processor 410 may differently configure a start point and moving direction of the user interface 830, for example, based on a type of the event that has occurred.

Figure 9:
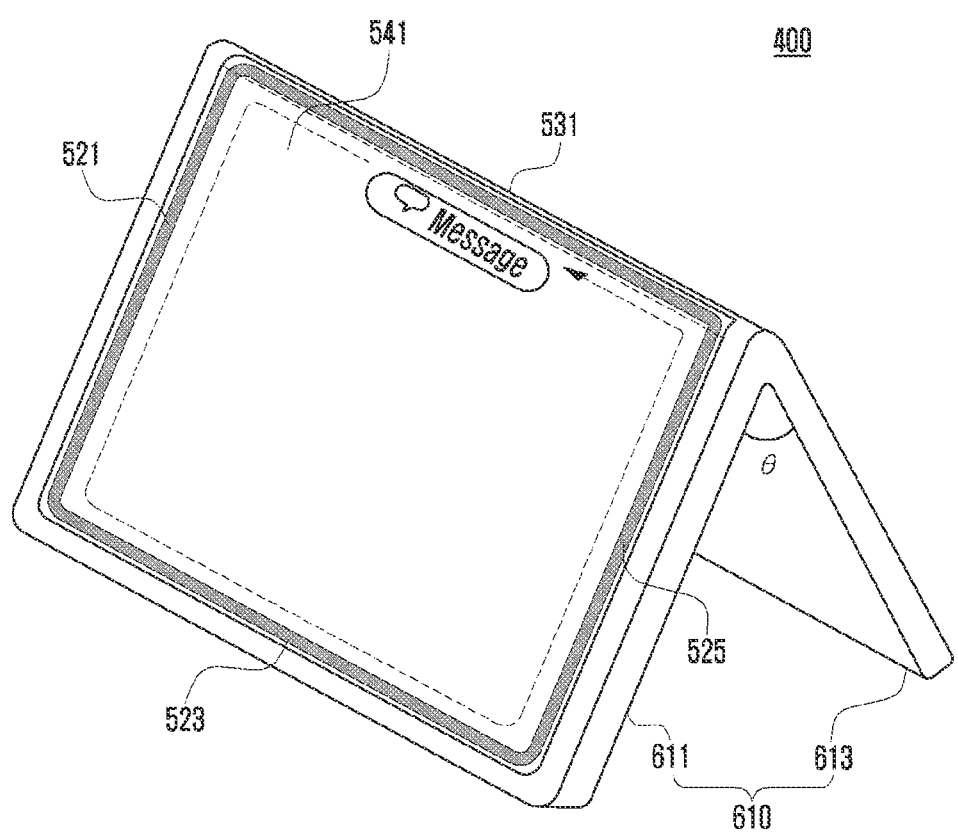
FIG. 9 is a perspective view illustrating an example of displaying a user interface in an electronic device according to various embodiments.

FIG. 9 is a perspective view illustrating an example of displaying a user interface in an electronic device according to various embodiments.

FIG. 9 is a perspective view illustrating an example of displaying the user interface according to an event (e.g., message reception event) occurrence when the electronic device 400 according to various embodiments is in an unfolded state at certain degree θ. The unfolded state at a certain angle may refer, for example, an unfolded state in which an angle θ between a first housing structure 611 and a second housing structure 613 of a foldable housing of the electronic device 400 is a certain angle which falls within a range of more than 0 and less than 180 degrees.

The processor 410 according to various embodiments may identify a folding state of the electronic device 400 in response to detection of the event occurrence. The processor 410 may identify an angle between the first housing structure 611 and the second housing structure 613 through, for example, a sensor module 440.

According to various embodiments, when the angle between the first housing structure 611 and the second housing structure 613 falls in the range of more than 0 and less than 180 degrees, the processor 410 may determine a first edge area 521, a second edge area 523, a third edge area 525, a first folding area 531, and a second folding area 533 of the first display 421 as an area for displaying a user interface. In the case of the electronic device 400 in the folded state, the first folding area 531 and the second folding area 533 may correspond to a curved portion of the first display 421.

According to various embodiments, the processor 410 may display the user interface in the first edge area 521, the second edge area 523, the third edge area 525, the first folding area 531, and the second folding area 533 which are determined areas. According to various embodiments, the processor 410 may provide, to a user, an animation effect such as the user interface moving in a determined direction (e.g., counterclockwise direction). According to various embodiments, the processor 410 may variously configure a start point and moving direction of the user interface. The processor 410 may differently configure a start point and moving direction of the user interface, for example, based on a type of the event that has occurred.

The processor 410 according to various embodiments may determine, using a gyro sensor or an acceleration sensor, whether the electronic device 400 is in a portrait view mode or landscape view mode.

The processor 410 according to various embodiments may adjust a starting position of the user interface according to the view mode of the electronic device 400. For example, when the electronic device 400 is determined to be in the horizontal view mode, the processor 410 may change the starting position such that the user interface, which starts to be displayed at the upper end of the first display 421 in the portrait view mode, starts to be displayed at the upper end of the first display 421 in the landscape view mode.

Figure 10:
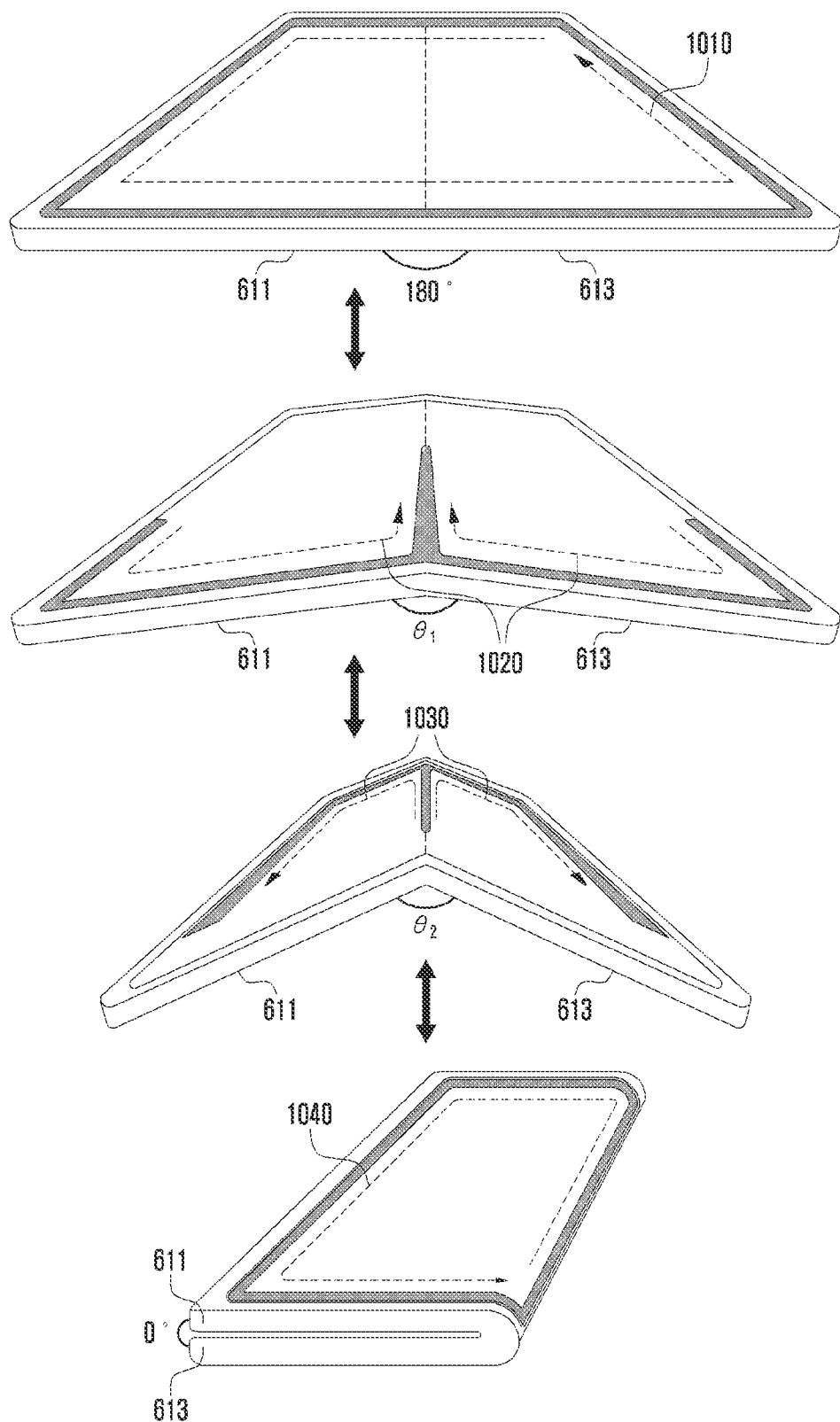
FIG. 10 is a perspective view illustrating an example of displaying a user interface in an electronic device according to a folding operation or an unfolding operation according to various embodiments.

FIG. 10 is a perspective view illustrating examples of displaying a user interface in an electronic device 400 according to a folding operation or an unfolding operation according to various embodiments.

Referring to FIG. 10, the electronic device 400 according to various embodiments may perform a folding operation or an unfolding operation around a folding axis 510 by an external force.

The processor 410 according to various embodiments may display the user interface, based on the unfolding operation or the folding operation of the electronic device 400.

The processor 410 according to various embodiments may detect an angle change event between a first housing structure 611 and a second housing structure 613. According to various embodiments, the processor 410 may be operationally connected to a sensor module 440 for measuring an angle between the first housing structure 611 and the second housing structure 613. The processor 410 may detect an angle change event between the first housing structure 611 and the second housing structure 613, based on data received from the sensor module 440 for measuring an angle.

According to various embodiments, the processor 410 may detect the angle change event between the first housing structure 611 and the second housing structure 613 using at least one sensor (e.g., Hall sensor) capable of identifying a folding state of the electronic device 400.

According to various embodiments, the processor 410 may continuously identify an angle change between the first housing structure 611 and the second housing structure 613 until the angle change event ends, in response to detecting the occurrence of the angle change event between the first housing structure 611 and the second housing structure 613.

According to various embodiments, the processor 410 may continuously change the area for displaying the user interface, based on the identified angle change.

In FIG. 10, a change in a descending direction illustrates a folding operation of an electronic device 400 and a change in an ascending direction illustrates an unfolding operation of an electronic device 400. Hereinafter, it will be illustrated with the folding operation.

The electronic device 400 illustrated at the upper most part in FIG. 10 shows that a user interface is displayed in an edge area 520 of a first display 421 when the electronic device 400 is in the folded state, that is, an angle between a first housing structure 611 and a second housing structure 613 is 180 degrees. A processor 410 may display, for example, the user interface like the case in which the same moves in a configured direction 1010.

The electronic device 400 illustrated at the second from the top in FIG. 10 shows a case in which the folding operation starts and an angle between the first housing structure 611 and the second housing structure 613 becomes $\theta_1$. In this case, as the electronic device 400 starts the folding operation, the processor 410 may display the user interface in a folding area (e.g., first folding area 531 and second folding area 533) and an edge area at the lower end of the first display 421 (e.g., lower end of second edge area 523, third edge area 525, sixth edge area 526, and lower end of fifth edge area 524). According to various embodiments, the processor 410 may impart an animation effect on the user interface the user interface like the case in which the same starts to be displayed at multiple start points and moves in multiple directions (1020).

The processor 410 may display user interfaces, for example, the user interfaces like the case in which the same moves from the edge area 520 to the folding area 530 of the first display 421. The processor 410 may display the user interfaces such that the user interfaces start at each of the first display area 541 of the first display 421 and the fifth edge area 524 of the second display area 543 and progress in a counterclockwise direction path in the first display area 541 and in a clockwise direction path in the second display area 543. The user interfaces starting from the second edge area 523 of the first display area 541 may be displayed like moving to the first folding area 531 via the third edge area 525 and the user interface starting from the fifth edge area 524 of the second display area 543 may be displayed like moving to the second folding area 533 via the sixth edge area 526.

The electronic device 400 illustrated at the third from the top in FIG. 10 shows a case in which the folding operation proceeds and an angle between the first housing structure 611 and the second housing structure 613 becomes $\theta_2$. $\theta_2$ may refer, for example, to an angle less than $\theta_1$. In this case, as the electronic device 400 performs the folding operation, the processor 410 may display the user interface in the folding area (e.g., first folding area 531 and second folding area 533) and an edge area at the upper end of the first display 421 (e.g., first edge area 521, upper end of second edge area 523, fourth edge area 522, and upper end of fifth edge area 524).

The processor 410 may display the user interface like the user interface moves from the folding area 530 of the first display 421 to the edge area 520. The processor 410 may display, for example, the user interface like the case in which the same having progressed to the first folding area 531 of the first display area 541 of the first display 421 keeps moving in the counterclockwise direction so as to move to the upper end of the first edge area 521 and the second edge area 523 and the user interface having progressed to the second folding area 533 of the second display area 543 keeps moving in the clockwise direction so as to move to the upper end of the fourth edge area 522 and the fifth edge area 524. The process 410 may display the user interface like the case in which the same start at multiple starting points and progresses in multiple directions (1030).

The electronic device 400 illustrated at the fourth from the top in FIG. 10 shows a case in which the folding operation is completed and an angle between the first housing structure 611 and the second housing structure 613 becomes 0. In this case, as the electronic device 400 completes the folding operation, the processor 410 may display the user interface in the first folding area 531 and the edge areas (e.g., first edge area 521, second edge area 523, and third edge area 525) of the first display area 541 in the first display 421.

The processor 410 may display, for example, the user interface like the case in which the same passes through the corner area of the first display area 541 in the first display 421 in a configured direction 1040. For example, the processor 410 may display the user interface like the case in which the same consecutively passes through the first edge area 521, the second edge area 523, the third edge area 525, and the first folding area 531.

The electronic device 400 according to various embodiments may display the user interface in response to the unfolding operation or the folding operation. The user may recognize a folding line of first display 421 and the folding operation (or unfolding operation) through the display method described above. The user may easily and visually recognize the area change in the first display 421 through the user interface display.

Figure 11:
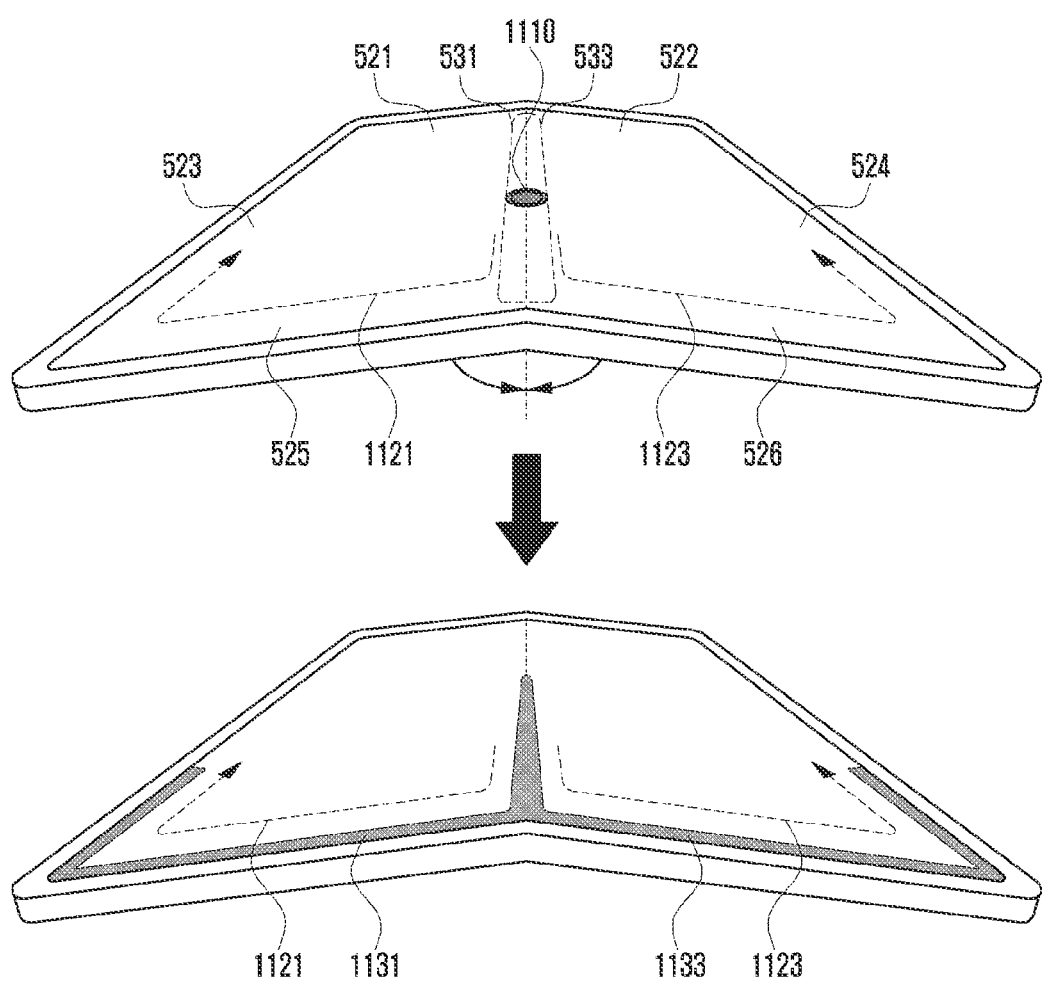
FIG. 11 is a perspective view illustrating an example of displaying a user interface according to an unfolding operation or a folding operation in an electronic device according to various embodiments.

FIG. 11 is a perspective view illustrating an example of displaying a user interface in an electronic device according to a folding operation or an unfolding operation according to various embodiments.

Referring to FIG. 11, when a folding operation (or unfolding operation) is detected, that is, a change of an angle between a first housing structure 611 and a second housing structure 613 is detected, a processor 410 according to various embodiments may display user interfaces 1131 and 1133. According to various embodiments, the processor 410 may variously configure a starting point 1110 and moving direction of the user interfaces 1131 and 1133 and the number of the user interfaces progressing. In the case of FIG. 10, it is illustrated that upon performing the folding operation, two user interfaces 1131 and 1133 start at the starting point 1110 at the center of the folding area and progress in directions 1121 and 1123 different from each other.

According to various embodiments, the processor 410 may display the user interfaces 1131 and 1133 like the same start at the center of the first folding area 531 and the center of the second folding area 533 and move in a clockwise direction 1121 in the first display area 541 and in a counterclockwise direction 1123 in the second display area 543. For example, the processor 410 may display the user interface like the case in which the user interfaces 1131 having started at the center of the first folding area 531 progresses in the clockwise direction 1121 and consecutively passes through a third edge area 525 and the lower end of a second edge area 523 in the first display area 541, and the user interface 1133 having started at the center of the second folding area 533 progresses in the counterclockwise direction 1123 and consecutively passes through a sixth edge area 526 and the lower end of a fifth edge area 524 in the second display area 543.

According to various embodiments, the processor 410 may variously configure a start point and moving direction of the user interface. The processor 410 may differently configure a start point and moving direction of the user interface, for example, based on a type of the event that has occurred. For example, the processor 410 may differently configure a moving direction of the user interface in the folding operation and a moving direction of the user interface in the unfolding operation.

Figure 12:
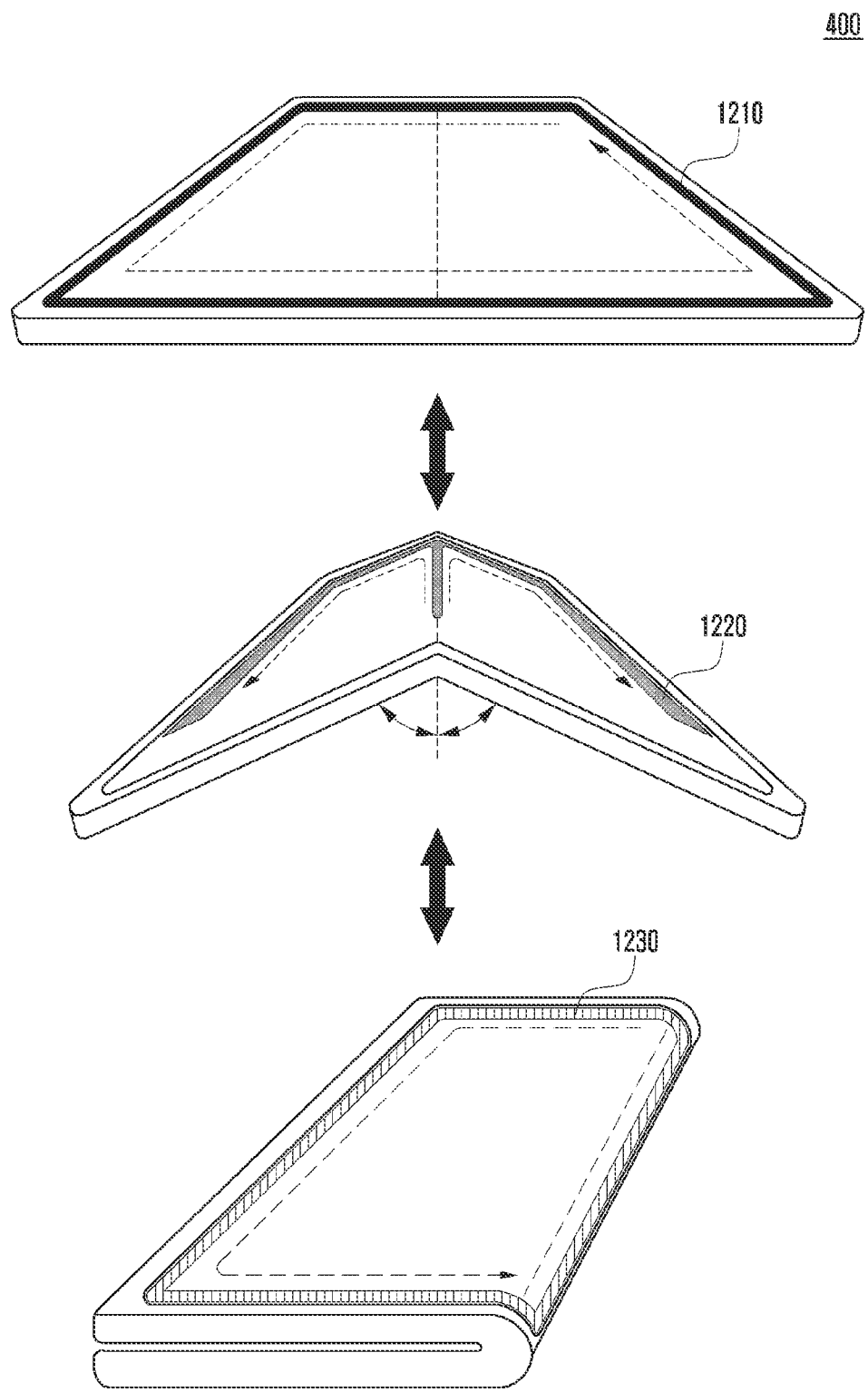
FIG. 12 is a perspective view illustrating an example of displaying a user interface according to an unfolding operation or a folding operation in an electronic device according to various embodiments.

FIG. 12 is a perspective view illustrating examples of displaying a user interface by an electronic device 400 according to various embodiments.

FIG. 12 is perspective view illustrating an example of differently displaying a user interface upon a folding operation (or unfolding operation) of an electronic device 400 in response to an angle change between a first housing structure 611 and a second housing structure 613 according to various embodiments.

According to various embodiments, a processor 410 may continuously change a display area, a display form, or a moving direction for displaying the user interface or a property of the user interface upon the folding operation (or unfolding operation) in response to an angle change between the first housing structure 611 and the second housing structure 613. For example, when the electronic device 400 is in the folded state, that is, the angle between the first housing structure 611 and the second housing structure 613 is 180 degrees, the processor 410 may display the user interface 1210 with a first color, when the electronic device 400 is performing the folding operation, that is, the angle between the first housing structure 611 and the second housing structure 613 is a certain angle of more than 0 degrees and less than 180 degrees, the processor 410 may display the user interface 1220 with a second color, and when the electronic device 400 is in the folded state, that is, the angle between the first housing structure 611 and the second housing structure 613 is 0 degrees, the processor 410 may display the user interface 1230 with a third color. For example, when the electronic device 400 is in the unfolded state, the processor 410 may display the user interface 1210 moving in a first direction (e.g., counterclockwise direction). For example, when the electronic device 400 is performing the folding operation, the processor 410 may display the user interface 1220 moving in the first direction (e.g., counterclockwise direction) in the first display area 541 and in the second direction (e.g., clockwise direction) in the second display area 543. For example, when the electronic device 400 is in the folded state and a screen is displayed in the first display area 541, the processor 410 may display the user interface 1230 moving in the first direction (e.g., counterclockwise direction). For example, when the electronic device 400 is in the folded state and a screen is displayed in the second display area 543 (not shown), the processor 410 may display the user interface moving in the second direction (e.g., clockwise direction).

According to various embodiments, in response to the angle change between the first housing structure 611 and the second housing structure 613, the processor 410 may display the user interface while continuously changing various properties of the user interface, for example, a user interface shape (e.g., line or plane), a user interface color (e.g., tone, saturation, or brightness), a user interface color effect (e.g., gradation effect or flickering effect), a user interface moving manner (e.g., moving by controlling pixel values or moving by continuously displaying a plurality of images), a user interface moving direction (e.g., clockwise direction or counterclockwise direction), a user interface moving velocity, and a user interface displaying time.

FIGS. 13A, 13B, 14A, 14B, 14C and 14D are diagrams and perspective views illustrating various examples of displaying a user interface in an in-folding type foldable electronic device according to various embodiments.

Figure 13A:
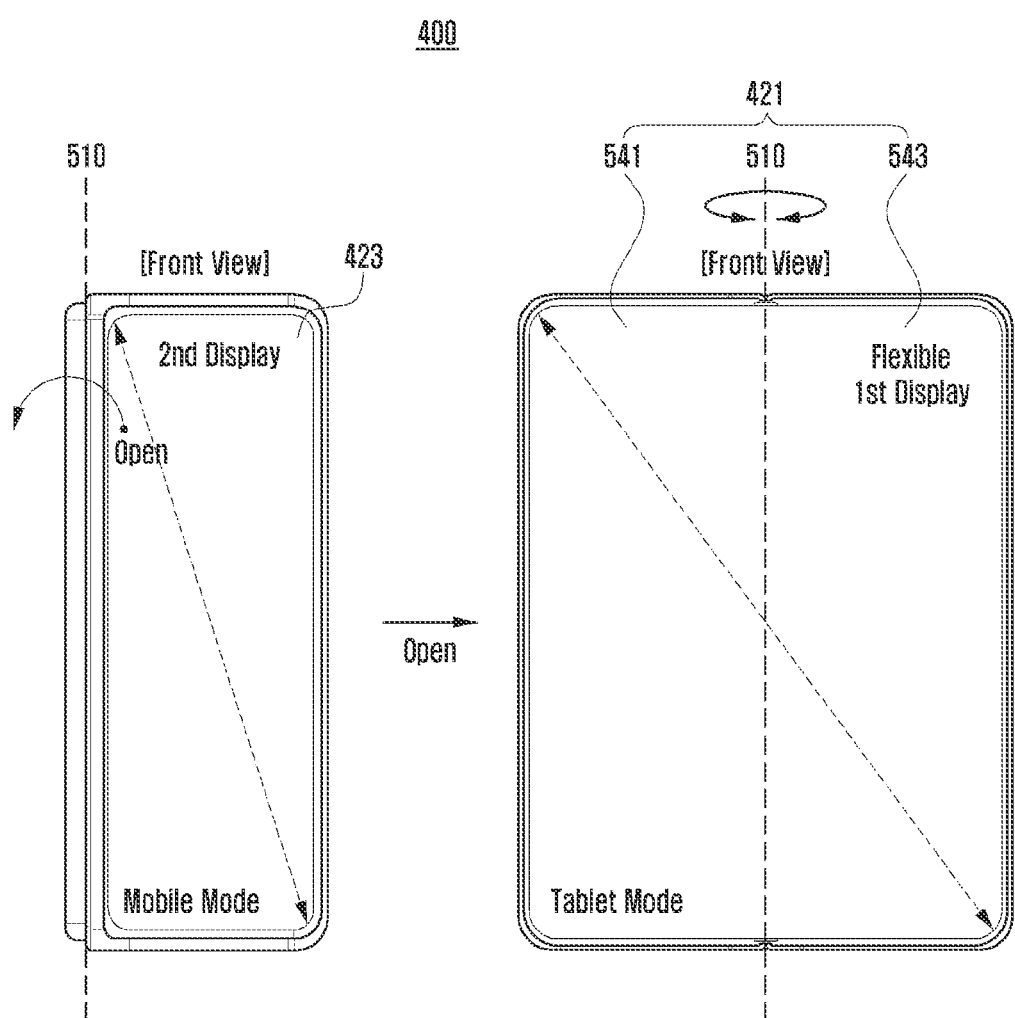
FIG. 13A and FIG. 13B are diagrams illustrating a folded state or an unfolded state of an electronic device according to various embodiments.
Figure 13B:
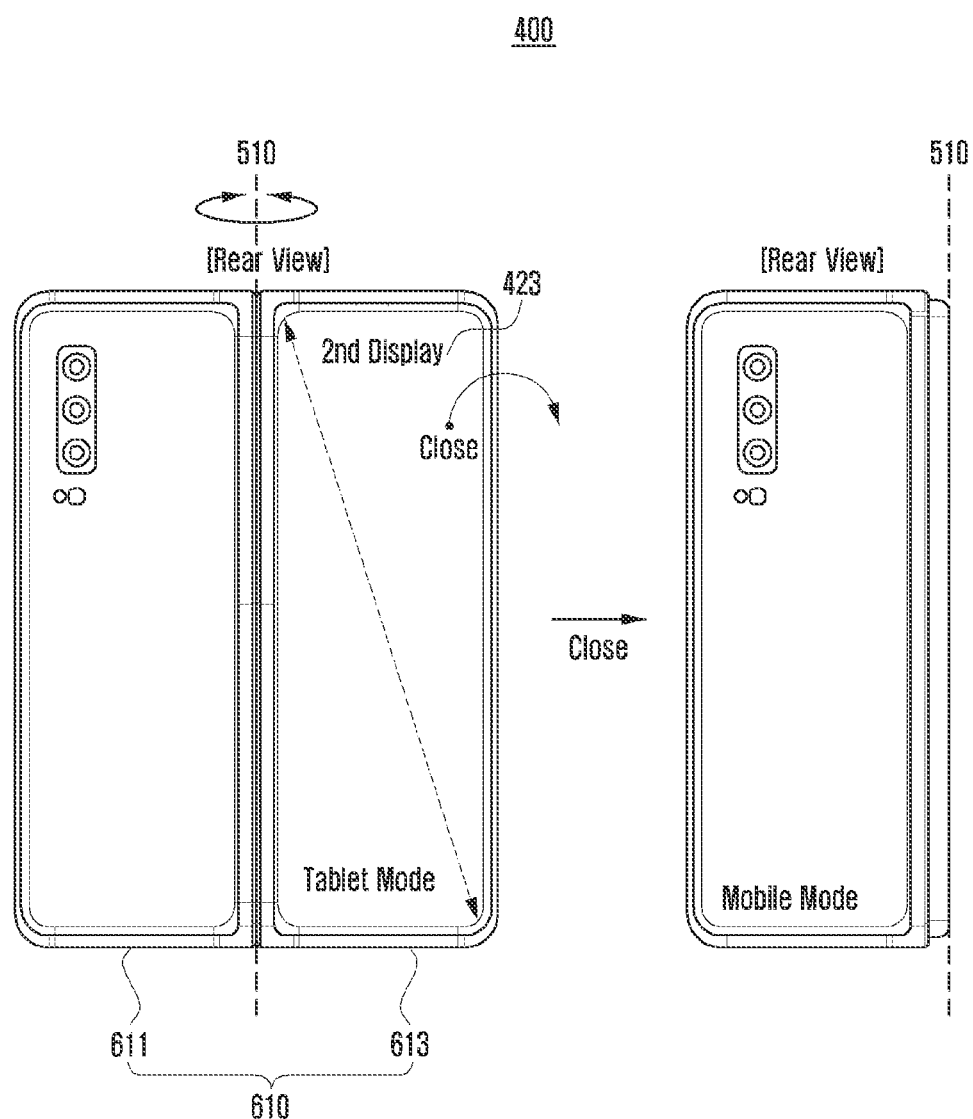

FIGS. 13A and 13B are diagrams illustrating a folded state or an unfolded state of an electronic device according to various embodiments. FIG. 13A is a diagram illustrating a front surface of the electronic device and FIG. 13B is a diagram illustrating a rear surface of the electronic device according to various embodiments.

Referring to FIG. 13A and FIG. 13B, the electronic device 400 according to various embodiments may include a first display 421 and a second display 423. The first display 421 may be a flexible display disposed in the front surface of the electronic device 400 and the second display 423 may be a display disposed in the rear surface of the electronic device 400.

The first display 421 according to various embodiments may include a first display area 541 exposed through a first surface of a first housing structure 611 and a second display area 543 exposed through a third surface of a second housing structure 613.

According to various embodiments, when the electronic device 400 performs a folding operation around a folding axis 510 so as to operate in a folded state, the first surface of the first housing structure 611 and the third surface of the second housing structure 613 may face each other so that the first display 421 may be deactivated and only the second display 423 may be activated. According to various embodiments, the processor 410 may display a user interface in at least one edge area of the second display 423.

FIGS. 14A, 14B, 14C and 14D are perspective views illustrating examples of displaying a user interface by an electronic device according to various embodiments.

FIGS. 14A, 14B, 14C and 14D are perspective views illustrating examples of displaying a user interface upon a folding operation or an unfolding operation of an electronic device 400 according to various embodiments. Hereinafter, it will be illustrated assuming an unfolding operation.

Figure 14A:
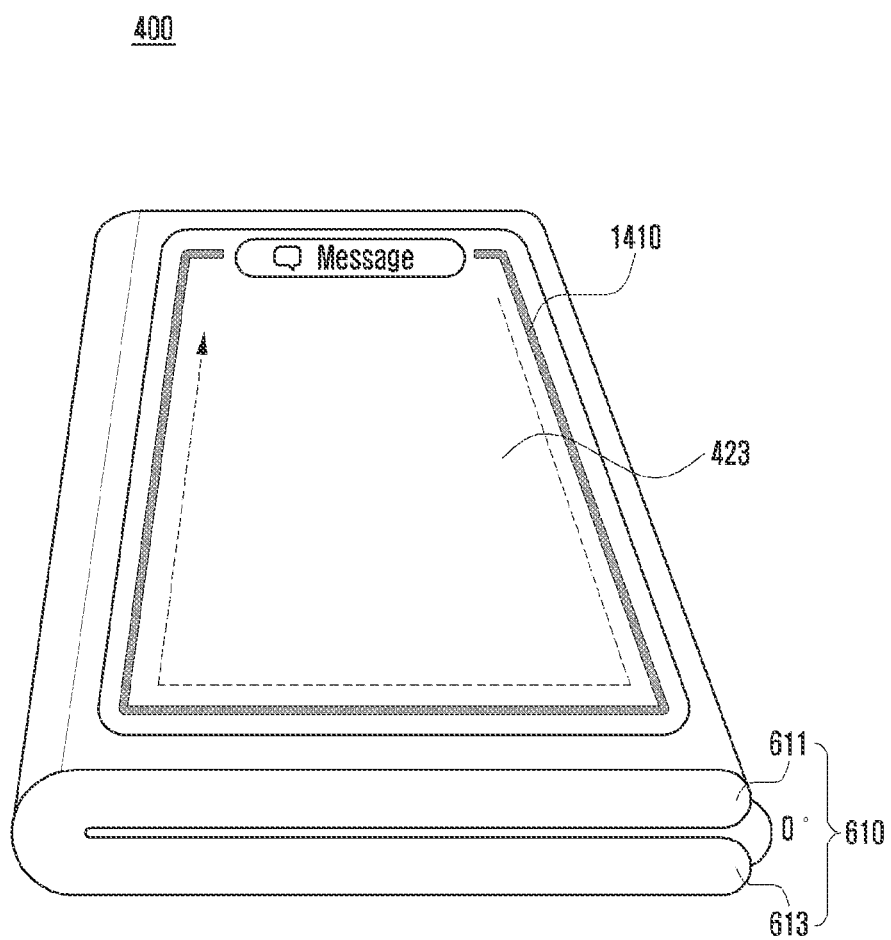
FIG. 14A, 14B, 14C and FIG. 14D are perspective views illustrating examples of displaying a user interface by an electronic device according to various embodiments.

FIG. 14A is a perspective view illustrating a folded state of an electronic device 400 according to various embodiments.

According to various embodiments, the folded state of the electronic device 400 may refer a case in which only the second display 423 is exposed while the first display 421 is not exposed. The folded state may refer a state in which, for example, the angle between a first housing structure 611 and a second housing structure 613 is 0 degrees.

The processor 410 according to various embodiments may display a user interface 1410 in at least one edge area of a second display 423. For example, the processor 410 may impart an animation effect on the user interface 1410 like the case in which the same moves in the clockwise direction in the edge area of the second display 423.

Figure 14B:
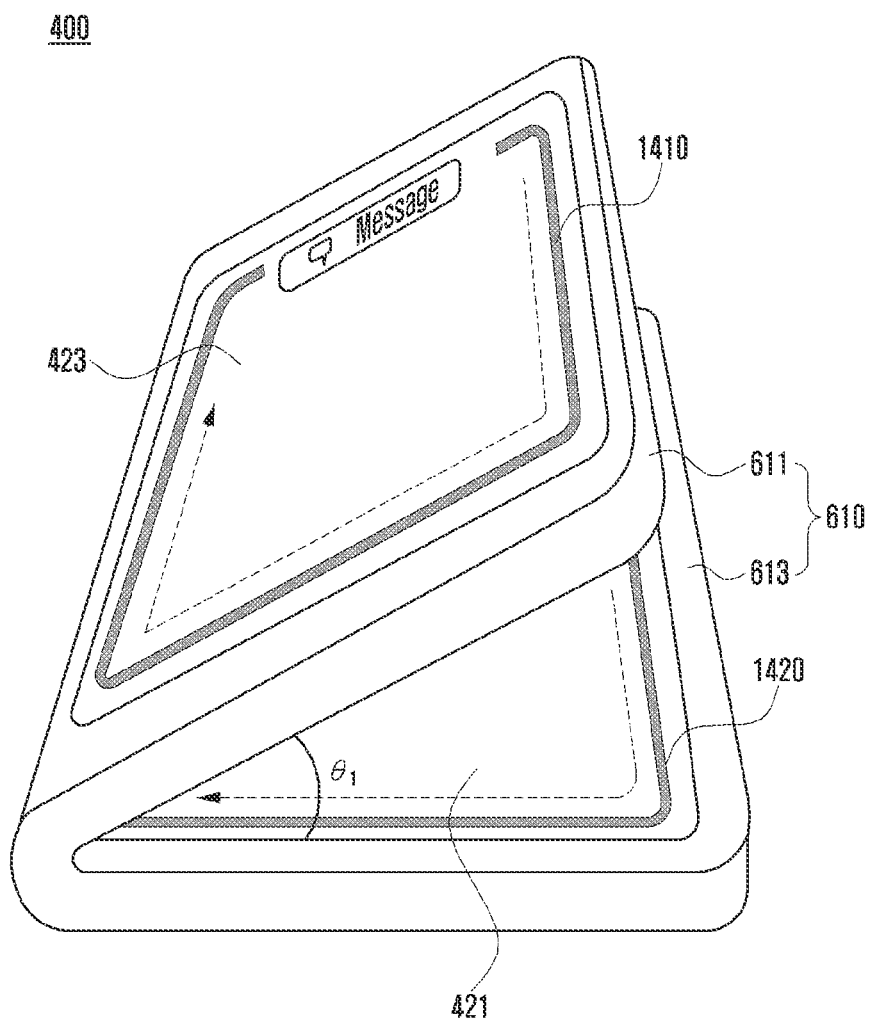

FIG. 14B is a perspective view illustrating a state in which an angle between the first housing structure 611 and the second housing structure 613 becomes $\theta_1$ by starting the unfolding operation by the electronic device 400 according to various embodiments. In the case described above, as the electronic device 400 starts the unfolding operation, the processor 410 may display the user interface in both of the first display 421 and the second display 423.

According to various embodiments, a first user interface 1420 displayed through the first display 421 and a second user display 1410 displayed through the second display 423 may be identical to or different from each other in terms of properties (e.g., shape, color, color effect, moving direction, moving velocity, and displaying time).

According to various embodiments, when the angle between the first housing structure 611 and the second housing structure 613 is more than 0 degrees and less than 180 degrees, the processor 410 may display the user interface in each of the first display 421 and the second display 423. For example, when the angle between the first housing structure 611 and the second housing structure 613 is less than a pre-configured angle, the processor 410 may display the user interface in an edge area 520 of the first display 421, a folding area 530 of the first display 421, and an edge area of the second display 423.

Figure 14C:
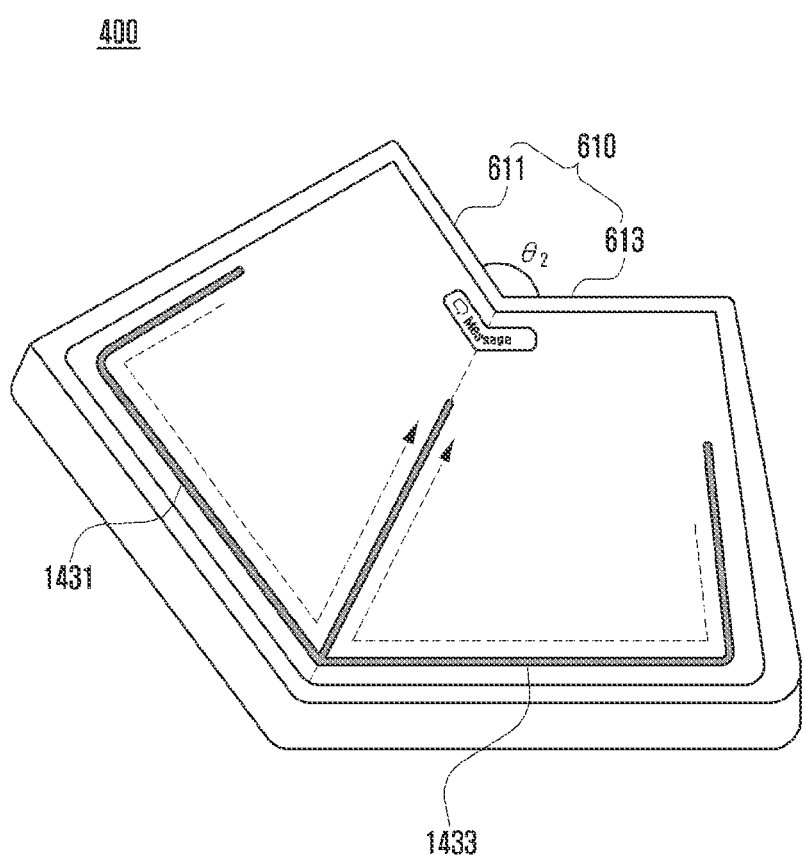

FIG. 14C is a perspective view illustrating a state in which an angle between the first housing structure 611 and the second housing structure 613 becomes $\theta_2$ by proceeding the unfolding operation by the electronic device 400 according to various embodiments.

In the case described above, when the electronic device 400 proceeds with the unfolding operation, the processor 410 may display the user interfaces 1431 and 1433 in the first display 421.

According to various embodiments, the first user interfaces 1431 and 1433 displayed through the first display 421 as shown in FIG. 14C may be displayed in a similar manner as those illustrated with reference to FIG. 10 and FIG. 11. For example, the processor 410 may display the user interfaces 1431 and 1433 in the folding area (e.g., folding area 530 in FIG. 5) and the edge area (e.g., edge area 520 in FIG. 5) of the first display 421.

Figure 14D:
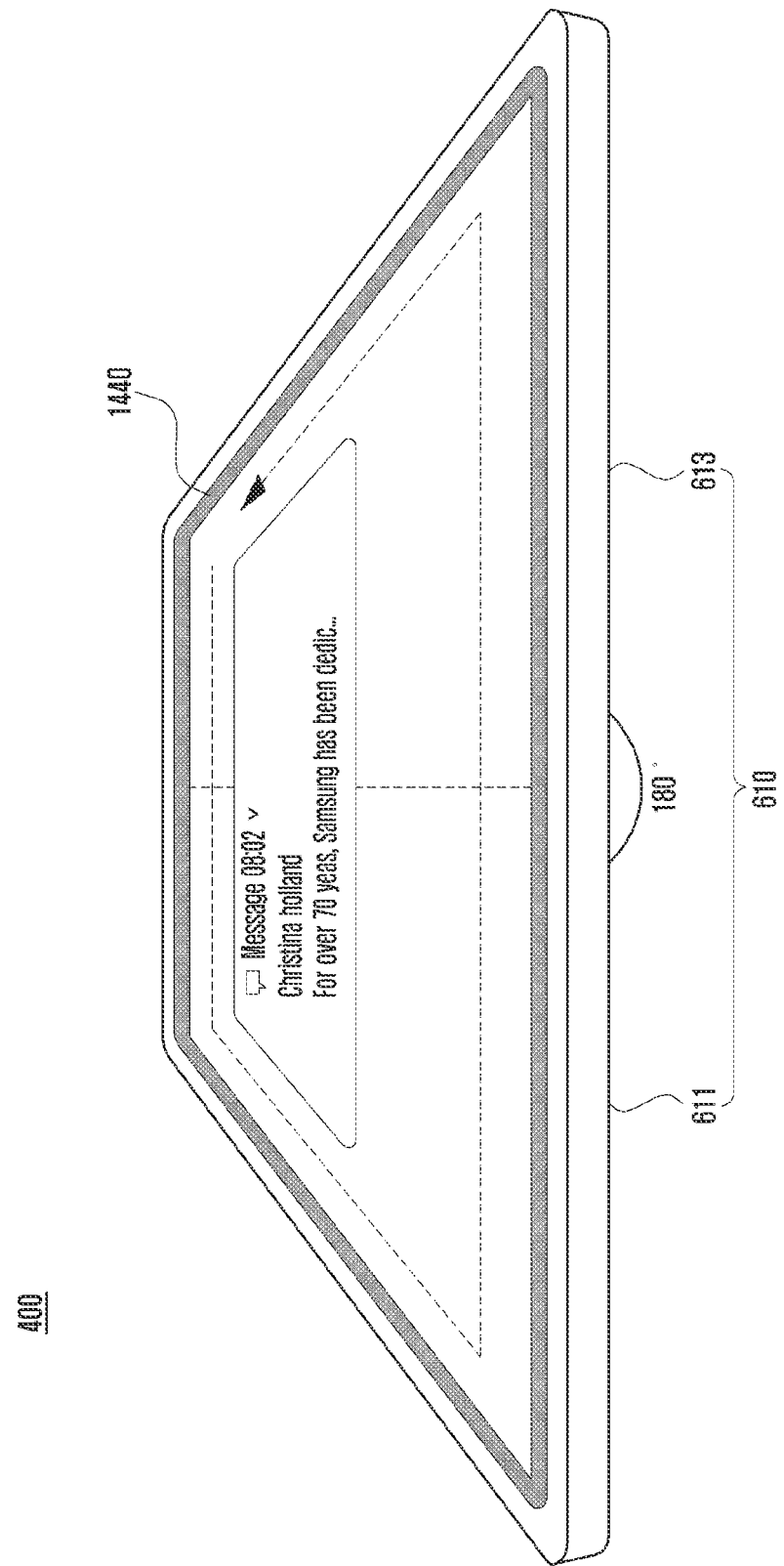

FIG. 14D is a perspective view illustrating a state in which an angle between the first housing structure 611 and the second housing structure 613 becomes 180 by completing the unfolding operation by the electronic device 400 according to various embodiments. The processor 410 according to various embodiments may display a user interface 1440 in the edge area of the first display 421.

When the angle between the first housing structure 611 and the second housing structure 613 is 180 degrees, the processor 410 according to various embodiments may deactivate the second display 423 or may stop displaying the second user interface in the second display 423.

The electronic device 400 according to various embodiments may display the user interface in response to the event (e.g., message reception event) occurrence.

FIG. 15 is a flowchart 1500 illustrating an example method of operating an electronic device according to various embodiments.

Referring to the flowchart 1500, in operation 1510, a processor 410 according to various embodiments may detect whether an event configured to display a user interface has occurred.

In operation 1520, the processor 410 according to various embodiments may identify an angle between the first housing structure 611 and the second housing structure 613 of the electronic device 400 through a sensor module 440.

In operation 1530, the processor 410 according to various embodiments may determine, based on the identified angle, at least one area for displaying the user interface. The processor 410 may determine, for example, one area for displaying the user interface from among at least one edge area or folding area of the flexible display (e.g., first display 421 in FIG. 4).

In operation 1540, the processor 410 according to various embodiments may control the display to display the user interface in the determined area.

An electronic device according to various example embodiments may include: a foldable housing including a hinge; a first housing connected to the hinge and including a first surface facing a first direction and a second surface facing a second direction opposite the first direction; and a second housing connected to the hinge, including a third surface facing a third direction and a fourth surface facing a fourth direction opposite the third direction, the second housing configured to be folded toward the first housing about the hinge structure, wherein in the foldable housing, the third direction is opposite to the first direction in a folded state and the third direction is the same as the first direction in a fully unfolded state, a flexible display configured to be visible through the first surface of the first housing and the third surface of the second housing and including at least one edge area and/or folding area; a communication circuit disposed in the foldable housing; a sensor module comprising at least one sensor disposed in the foldable housing; a processor disposed in the first housing structure or the second housing structure and operatively connected to the flexible display, the communication circuit, and the sensor module; and a memory operatively connected to the processor.

In the electronic device according to various example embodiments disclosed herein, the memory may store instructions that, when executed, cause the processor to: sense whether an event configured to display a user interface has occurred, identify an angle between the first housing and the second housing using the sensor module, determine, based on the identified angle, at least one area for displaying the user interface from among the at least one edge area or folding area of the flexible display, and control the display to display the user interface in the determined at least one area.

In the electronic device according to various example embodiments disclosed herein, the flexible display may include a first display area including a first edge area, a second edge area, and a third edge area which are visible through the first surface and include a space spaced apart from a periphery of the flexible display by a specified interval, and a first folding area including a space spaced apart, by a specified interval, from a folding line or a bending line generated based on the flexible display being folded via the hinge; and a second display area including a fourth edge, a fifth edge area, and a sixth edge area which are visible through the third surface and include a space spaced apart from a periphery of the flexible display by a specified interval, and a second folding area including a space spaced apart from the folding line or the bending line of the flexible display by a specified interval.

In the electronic device according to various example embodiments disclosed herein, based on the processor controlling the display to display the user interface, the instructions stored in the memory, when executed, may cause the processor to consecutively display the user interface, in a clockwise or counterclockwise progress direction, starting from a specified start point included in the determined area.

In the electronic device according to various example embodiments disclosed herein, the instructions stored in the memory, when executed, may cause the processor to determine, based on a type of the event that has occurred, a displaying start point, displaying progress direction, and displaying shape of the user interface.

In the electronic device according to various example embodiments disclosed herein, the instructions stored in the memory, when executed, may cause the processor to control the display to display the user interface while changing at least one of tone, saturation, brightness, or transparency of at least a part of the user interface.

The event according to various example embodiments disclosed herein may include at least one of a message reception event, a call reception event, an application update event, or a user authentication event.

The event according to various example embodiments disclosed herein may include an angle change event between the first housing and the second housing.

In the electronic device according to various example embodiments disclosed herein, in response to the detection of the angle change event occurrence, the instructions stored in the memory, when executed, may cause the processor to continuously identify the angle between the first housing and the second housing using the sensor module until an end of the angle change event and based on the identified angle, change the at least one area for displaying the user interface.

In the electronic device according to various example embodiments disclosed herein, the instructions stored in the memory, when executed, may cause the processor to change a property of the user interface being displayed, based on the identified angle.

The electronic device according to various example embodiments disclosed herein may further include: a second display visible through the second surface or the fourth surface and including at least one edge area.

In the electronic device according to various example embodiments disclosed herein, the instructions stored in the memory, when executed, may cause the processor to determine, based on the identified angle, at least one area for displaying the user interface from among the at least one edge area of the flexible display, the folding area of the flexible display, or the at least one edge area of the second display.

In the electronic device according to various example embodiments disclosed herein, based on the identified angle falling within a specified angle range, the instructions stored in the memory, when executed, may cause the processor to control the display to display the user interface in the at least one edge area of the flexible display, the folding area of the flexible display, and the at least one edge area of the second display.

A method of providing notification of an electronic device according to various example embodiments of disclosed herein may include: sensing whether an event configured to display a user interface has occurred; identifying, using a sensor module, an angle between a first housing connected to a hinge and including a first surface facing a first direction and a second surface facing a second direction opposite the first direction, and a second housing connected to the hinge, including a third surface facing a third direction and a fourth surface facing a fourth direction opposite the third direction, the second housing being folded toward the first housing about the hinge; determining, based on the identified angle, at least one area for displaying the user interface from among at least one edge area or folding area of the flexible display; and displaying the user interface in the determined at least one area through the flexible display.

In the method of providing notification of an electronic device according to various example embodiments disclosed herein, the displaying may further include consecutively displaying the user interface starting from a specified start point included in the determined area while progressing in a clockwise or counterclockwise direction.

In the method of providing notification of an electronic device according to various example embodiments disclosed herein, the method for providing notification may further include determining, based on a type of the event that has occurred, a displaying start point, a displaying progress direction, and a displaying shape of the user interface.

In the method of providing notification of an electronic device according to various example embodiments of the disclosure, the displaying may further include displaying the user interface while changing at least one of tone, saturation, brightness, or transparency of at least a part of the user interface.

In the method of providing notification of an electronic device according to various example embodiments of the disclosure, the event may include at least one of a message reception event, a call reception event, an application update event, or a user authentication event.

In the method of providing notification of an electronic device according to various example embodiments of the disclosure, the event may include an angle change event between the first housing and the second housing, the identifying may include continuously identifying, in response to the detection of the angle change event occurrence, the angle between the first housing and the second housing using the sensor module until the end of the angle change event, and the determining may include changing, based on the identified angle, the at least one area for displaying the user interface.

In the method of providing notification of an electronic device according to various example embodiments of the disclosure, the changing may further include changing, based on the identified angle, a property of the user interface being displayed.

In the method of providing notification of an electronic device according to various example embodiments of the disclosure, the determining may include determining at least one area for displaying the user interface from among the at least one edge area of the flexible display, the folding area of the flexible display, or the at least one edge area of the second display visible through the second surface of the fourth surface and include at least one edge area.

In the method of providing notification of an electronic device according to various example embodiments of the disclosure, based on the identified angle falling within a specified angle range, the determining may include determining the at least one edge area of the flexible display, the folding area of the flexible display, and the at least one edge area of the second display as an area for displaying the user interface.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:
1. An electronic device comprising:
a foldable housing comprising:
a hinge;
a first housing connected to the hinge and comprising a first surface facing a first direction and a second surface facing a second direction opposite the first direction; and
a second housing connected to the hinge, comprising a third surface facing a third direction and a fourth surface facing a fourth direction opposite the third direction, and configured to fold onto the first housing about the hinge, the third direction being opposite the first direction in a folded state, and the third direction being identical to the first direction in a fully unfolded state;
a flexible display configured to be visible through the first surface of the first housing and the third surface of the second housing and comprises at least one edge area and a folding area;
a communication circuit disposed in the foldable housing;
a sensor module including at least one sensor;
a processor; and
a memory,
wherein the memory stores instructions that, when executed, cause the processor to:
sense whether an event configured to display a user interface has occurred,
identify an angle between the first housing and the second housing using the sensor module,
control the display to display the user interface in the edge area of the flexible display when the foldable housing is in the fully unfolded state based on the identified angle, and
control the display to display the user interface in the at least one edge area and folding area of the flexible display when the foldable housing is in the folded state based on the identified angle, and
wherein the edge area includes areas spaced from a periphery of the flexible display.
2. The electronic device of claim 1, wherein the flexible display comprises:
a first display area comprising a first edge area, a second edge area, and a third edge area visible through the first surface and comprising a space spaced apart from a periphery of the flexible display by a specified interval, and a first folding area comprising a space spaced apart, by a specified interval, from a folding line or a bending line generated when the flexible display is folded via the hinge; and
a second display area comprising a fourth edge, a fifth edge area, and a sixth edge area visible through the third surface and comprising a space spaced apart from a periphery of the flexible display by a specified interval, and a second folding area comprising a space spaced apart from the folding line or the bending line of the flexible display by a specified interval.

3. The electronic device of claim 2, wherein based on the display displaying the user interface, the instructions, when executed, cause the processor to adjust a property of the user interface to consecutively display the user interface in a clockwise or counterclockwise progress direction, starting from a specified start point included in the determined area.

4. The electronic device of claim 3, wherein the instructions, when executed, cause the processor to determine, based on a type of the event that has occurred, a displaying start point, a displaying progress direction, and a displaying shape of the user interface.

5. The electronic device of claim 1, wherein the instructions, when executed, cause the processor to control the display to display the user interface while changing at least one of tone, saturation, brightness, or transparency of at least a part of the user interface.

6. The electronic device of claim 1, wherein the event comprises at least one of a message reception event, a call reception event, an application update event, or a user authentication event.

7. The electronic device of claim 1, wherein the event comprises an angle change event between the first housing and the second housing,
wherein the instructions, when executed, cause the processor to continuously identify, in response to detection of the angle change event, an angle between the first housing and the second housing using the sensor module until the end of the angle change event, and to change, based on the identified angle, at least one area for displaying the user interface or a property of the user interface being displayed.

8. The electronic device of claim 1, further comprising a second display visible through the second surface or the fourth surface and comprising at least one edge area,
wherein the instructions, when executed, cause the processor to determine, based on the identified angle, at least one area for displaying the user interface from among the at least one edge area of the flexible display, the folding area of the flexible display, or at least one edge area of the second display,
and based on the identified angle falling within a preconfigured angle range, to control the display to display the user interface in the at least one edge area of the flexible display, the folding area of the flexible display, and at least one edge area of the second display.

9. A method for providing a notification by an electronic device, the method comprising:
sensing whether an event configured to cause display of a user interface has occurred;
identifying, using a sensor module, an angle between a first housing connected to a hinge and comprising a first surface facing a first direction and a second surface facing a second direction opposite the first direction, and a second housing connected to the hinge, comprising a third surface facing a third direction and a fourth surface facing a fourth direction opposite the third direction, the second housing configured to fold onto the first housing about the hinge;
displaying the user interface in the edge area of the flexible display when the foldable housing is in the fully unfolded state based on the identified angle, and
displaying the user interface in the at least one edge area and folding area of the flexible display when the foldable housing is in the folded state based on the identified angle, and
wherein the edge area includes areas spaced from a periphery of the flexible display.

10. The method of claim 9, wherein the flexible display comprises:
a first display area comprising a first edge area, a second edge area, and a third edge area visible through the first surface and comprising a space spaced apart from a periphery of the flexible display by a specified interval, and a first folding area comprising a space spaced apart, by a specified interval, from a folding line or a bending line generated when the flexible display is folded via the hinge, and
a second display area comprising a fourth edge, a fifth edge area, and a sixth edge area visible through the third surface and comprising a space spaced apart from a periphery of the flexible display by a specified interval, and a second folding area comprising a space spaced apart from the folding line or the bending line of the flexible display by a specified interval.

11. The method of claim 10, wherein the displaying comprises consecutively displaying the user interface starting from a specified start point included in the determined area while progressing in a clockwise or counterclockwise direction,
wherein the method further comprises determining, based on a type of the event that has occurred, a displaying start point, a displaying progress direction, and a displaying shape of the user interface.

12. The method of claim 9, wherein the displaying further comprises displaying the user interface while changing at least one of hue, saturation, brightness, or transparency of at least a part of the user interface.

13. The method of claim 9, wherein the event comprises at least one of a message reception event, a call reception event, an application update event, or a user authentication event.

14. The method of claim 9, wherein the event comprises an angle change event between the first housing and the second housing,
wherein the identifying comprises continuously identifying, in response to detection of the angle change event, an angle between the first housing and the second housing using the sensor module until the end of the angle change event, and
the determining comprises changing, based on the identified angle, at least one area for displaying the user interface and further comprises changing a property of the user interface being displayed.

15. The method of claim 9, wherein the determining comprises determining at least one area for displaying the user interface from among the at least one edge area of a second display visible through the second surface or the fourth surface and comprising at least one edge area, the at least one edge area of the flexible display, or the folding area of the flexible display, and
based on the identified angle falling within a specified angle range, determining, as an area for displaying the user interface, the at least one edge area of the flexible display, the folding area of the flexible display, and the at least one edge area of the second display.

\* \* \* \* \*